(12) United States Patent
Teraoka et al.

(10) Patent No.: US 11,360,762 B2
(45) Date of Patent: Jun. 14, 2022

(54) INFORMATION UPDATE APPARATUS AND INFORMATION UPDATE METHOD

(71) Applicant: HITACHI AUTOMOTIVE SYSTEMS, LTD., Hitachinaka (JP)

(72) Inventors: Hidetoshi Teraoka, Tokyo (JP); Hiroki Yamazaki, Hitachinaka (JP); Masashi Yano, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 16/755,230

(22) PCT Filed: Oct. 5, 2018

(86) PCT No.: PCT/JP2018/037439
§ 371 (c)(1),
(2) Date: Apr. 10, 2020

(87) PCT Pub. No.: WO2019/073932
PCT Pub. Date: Apr. 18, 2019

(65) Prior Publication Data
US 2020/0249937 A1 Aug. 6, 2020

(30) Foreign Application Priority Data
Oct. 12, 2017 (JP) .............................. JP2017-198622

(51) Int. Cl.
*G06F 9/44* (2018.01)
*G06F 8/658* (2018.01)
*B60R 16/03* (2006.01)

(52) U.S. Cl.
CPC .............. *G06F 8/658* (2018.02); *B60R 16/03* (2013.01)

(58) Field of Classification Search
CPC ... G06F 8/658; G06F 8/65; G06F 8/61; B60R 16/03
(Continued)

(56) References Cited

U.S. PATENT DOCUMENTS 8,813,061 B2   8/2014  Hoffman et al.
10,514,900 B2 * 12/2019  Teraoka .................... G06F 8/65
(Continued)

FOREIGN PATENT DOCUMENTS

JP    2005-349878 A   12/2005
JP    2012-088767 A    5/2012
(Continued)

OTHER PUBLICATIONS

Data management in real-time systems: a case of on-demand updates in vehicle control systems, author: T Gustafsson et al, source IEEE published on 2004.*
(Continued)

*Primary Examiner* — Chameli Das
(74) *Attorney, Agent, or Firm* — Volpe Koenig

(57) ABSTRACT

An information update apparatus that updates first information stored in a vehicle control apparatus to second information. The information update apparatus includes: a download control unit that receives an update package including an update body that is a difference between the first information and the second information or the second information, procedure information including a procedure of updating the first information to the second information using the update body, and an activation condition that is a condition of starting updating the first information to the second information; and an event management unit that acquires a state of a vehicle on which the vehicle control apparatus and the information update apparatus are mounted, and causes an update execution unit to execute the update based on the (Continued)

procedure information when the state of the vehicle matches the activation condition.

10 Claims, 26 Drawing Sheets

(58) Field of Classification Search
USPC .......................................................... 717/173
See application file for complete search history.

(56) References Cited

U.S. PATENT DOCUMENTS

| | | | |
|---|---|---|---|
| 10,599,418 B2* | 3/2020 | Kiyama | .................. H04L 67/10 |
| 2003/0188303 A1* | 10/2003 | Barman | .................... G06F 8/64 |
| | | | 717/170 |
| 2005/0256614 A1* | 11/2005 | Habermas | ................. B60L 3/12 |
| | | | 701/1 |
| 2013/0198732 A1 | 8/2013 | Fujita | |
| 2014/0282470 A1 | 9/2014 | Buga et al. | |
| 2015/0094949 A1* | 4/2015 | Kato | .................. G01C 21/3688 |
| | | | 701/410 |
| 2015/0100955 A1* | 4/2015 | Chen | ....................... G06F 8/658 |
| | | | 717/170 |
| 2016/0294614 A1* | 10/2016 | Searle | .................... H04L 67/34 |
| 2017/0023918 A1* | 1/2017 | Frazer | ................. G05B 19/0421 |
| 2017/0148112 A1* | 5/2017 | Grose | .................... G06Q 50/04 |
| 2018/0018160 A1 | 1/2018 | Teraoka et al. | |
| 2018/0150290 A1 | 5/2018 | Matsuda | |
| 2019/0168772 A1* | 6/2019 | Emura | ................... B60W 50/10 |
| 2019/0235855 A1* | 8/2019 | Nakano | ............... G06F 13/4204 |
| 2019/0294429 A1* | 9/2019 | Mizutani | ................. G06F 11/00 |
| 2020/0371777 A1* | 11/2020 | Zhang | ....................... H04L 9/06 |
| 2021/0067607 A1* | 3/2021 | Gardner | ................ H04L 41/082 |
| 2021/0132942 A1* | 5/2021 | Bainville | .................. G06F 8/65 |

FOREIGN PATENT DOCUMENTS

| | | |
|---|---|---|
| JP | 2016-170740 A | 9/2016 |
| JP | 2016-218932 A | 12/2016 |
| JP | 2017-001567 A | 1/2017 |
| JP | 2017-097620 A | 6/2017 |
| JP | 2018-063659 A | 4/2018 |

OTHER PUBLICATIONS

Secure firmware updates over the air in intelligent vehicles author: DK Nisson et al, source IEEE ublished on 2008.*
Defending connected vehicles against malware: Challenges and a solution framework, author: T Zhang, published on 2014.*
Title: Natural, intuitive finger based input as substitution for traditional vehicle control; author: A Riener, published on 2011.*
Title: An architecture for reflexive autonomous vehicle control; author: D Payton, published on 1986.*
International Search Report and English Translation, PCT/JP2018/037439, dated Dec. 25, 2018, 11 pgs.
Extended European Search Report dated May 17, 2021 for European Patent Application No. 18866561.6.

* cited by examiner

[FIG. 1]
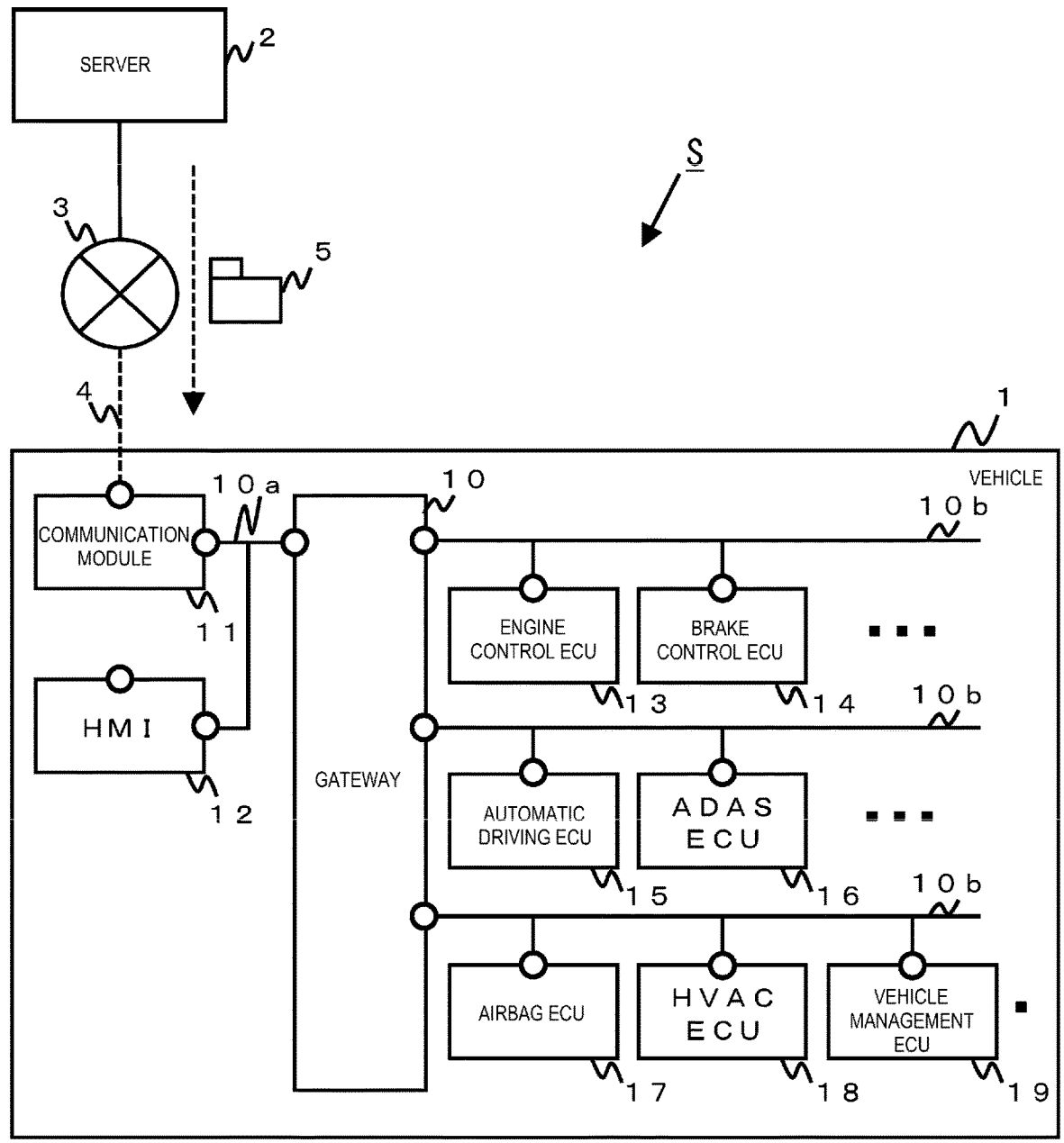

[FIG. 2]
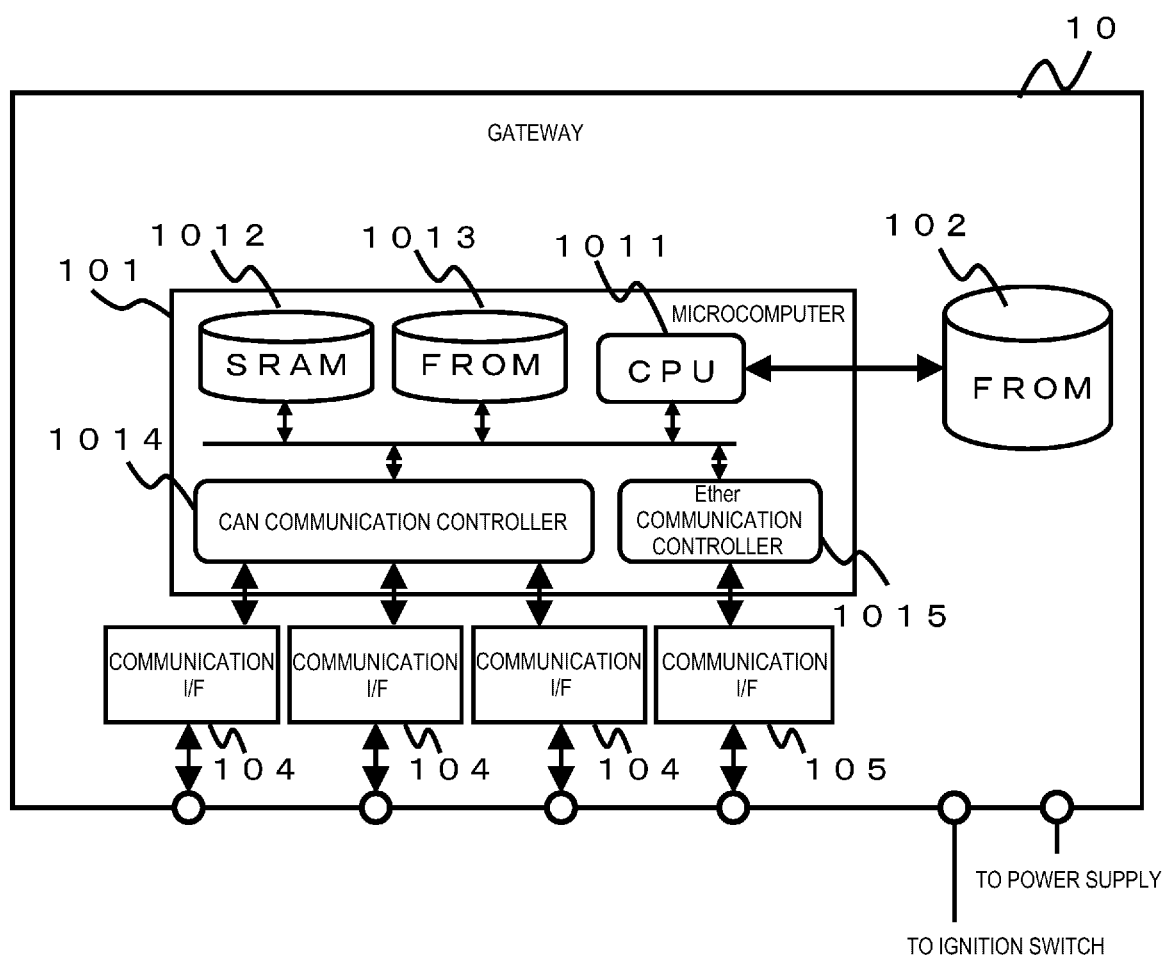

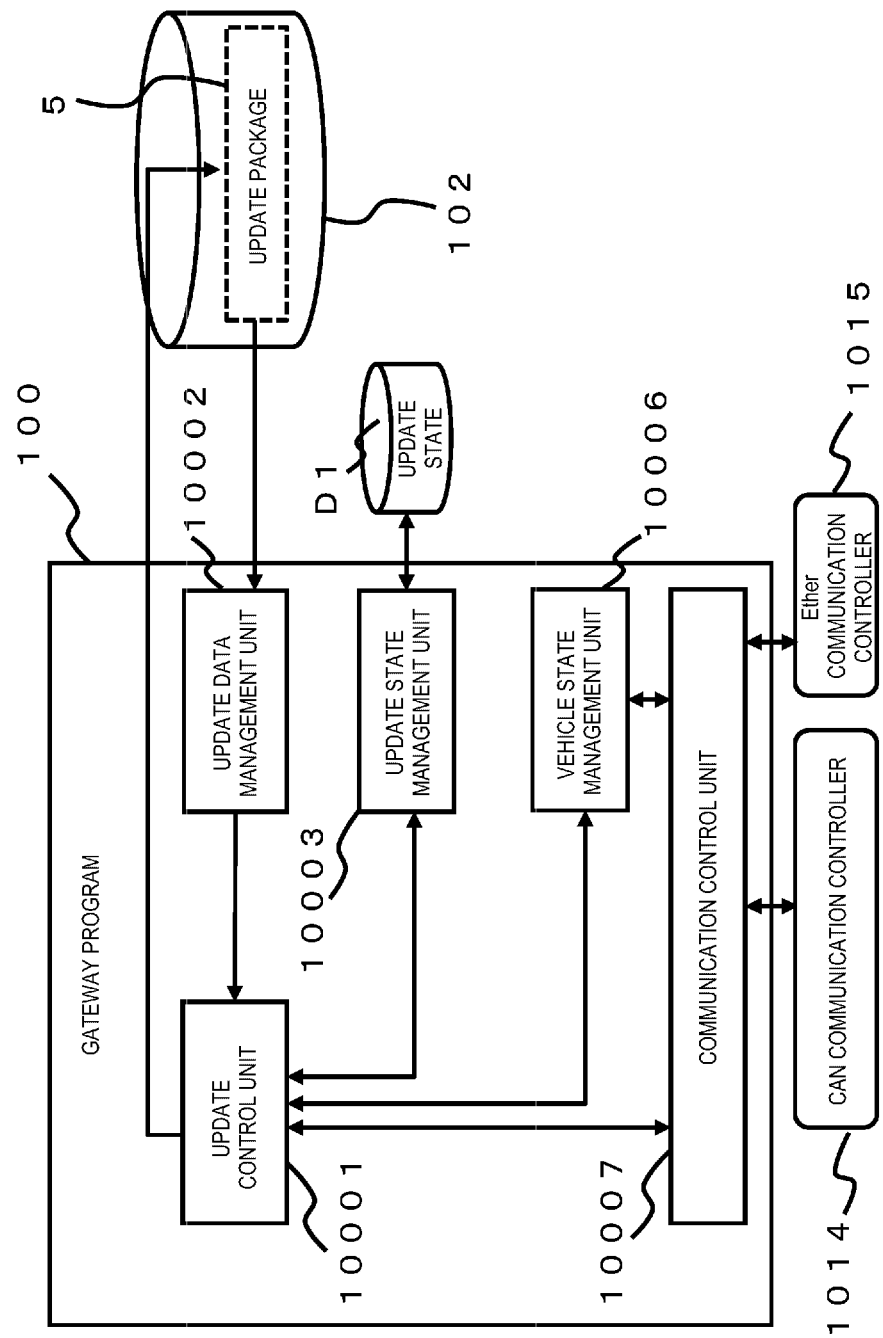
[FIG. 3]

[FIG. 4]
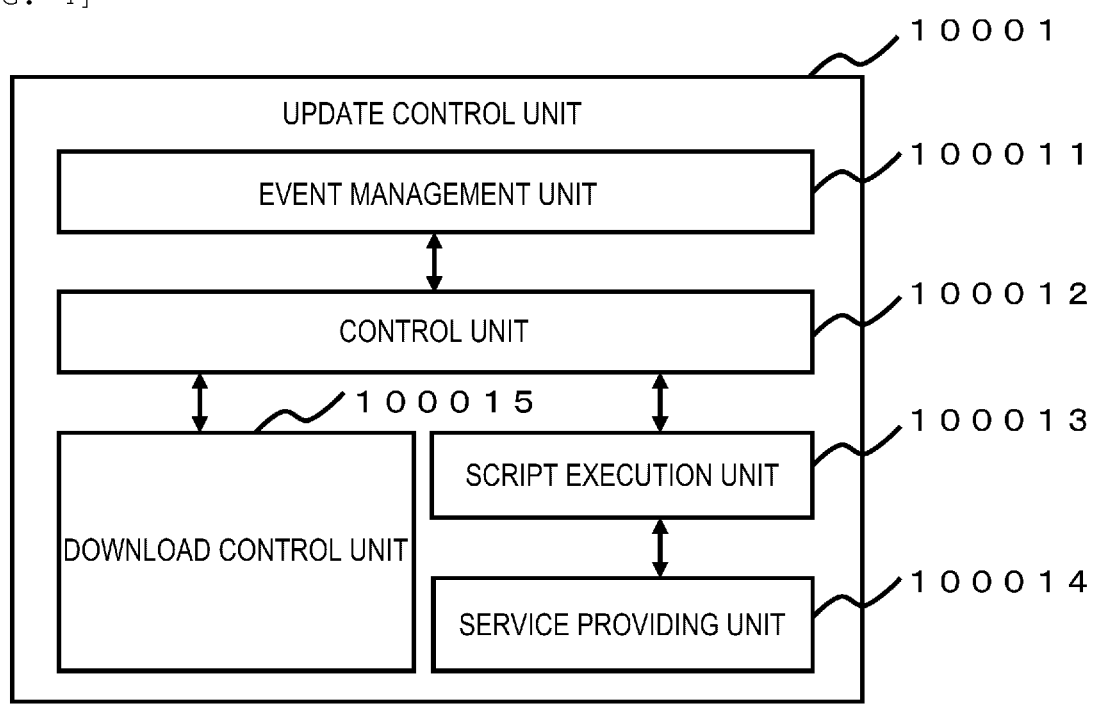

[FIG. 5]
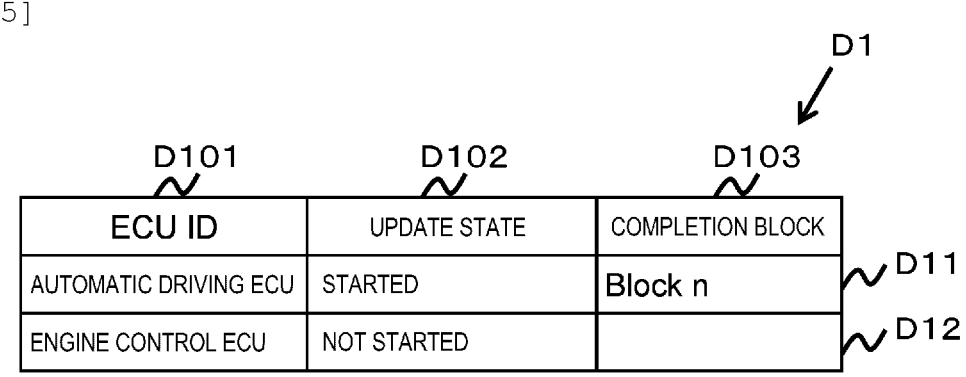

[FIG. 6]
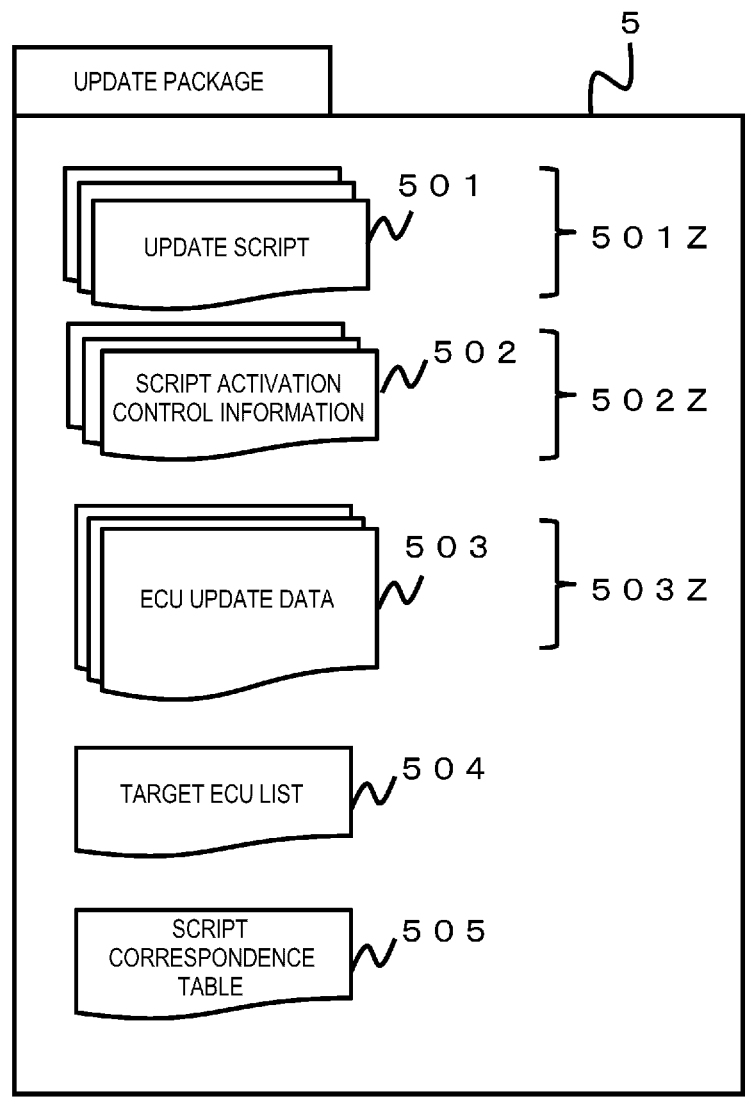

[FIG. 7]
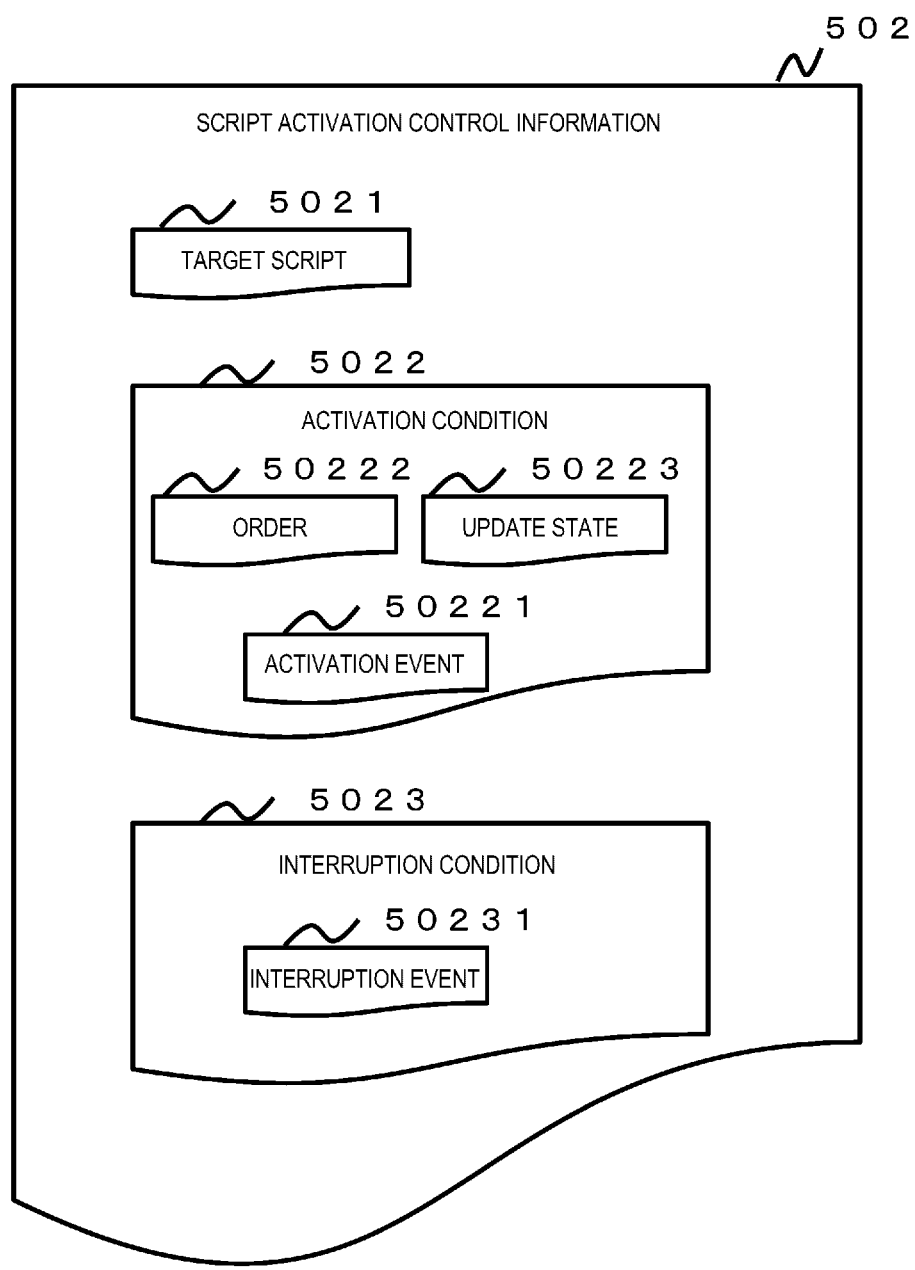

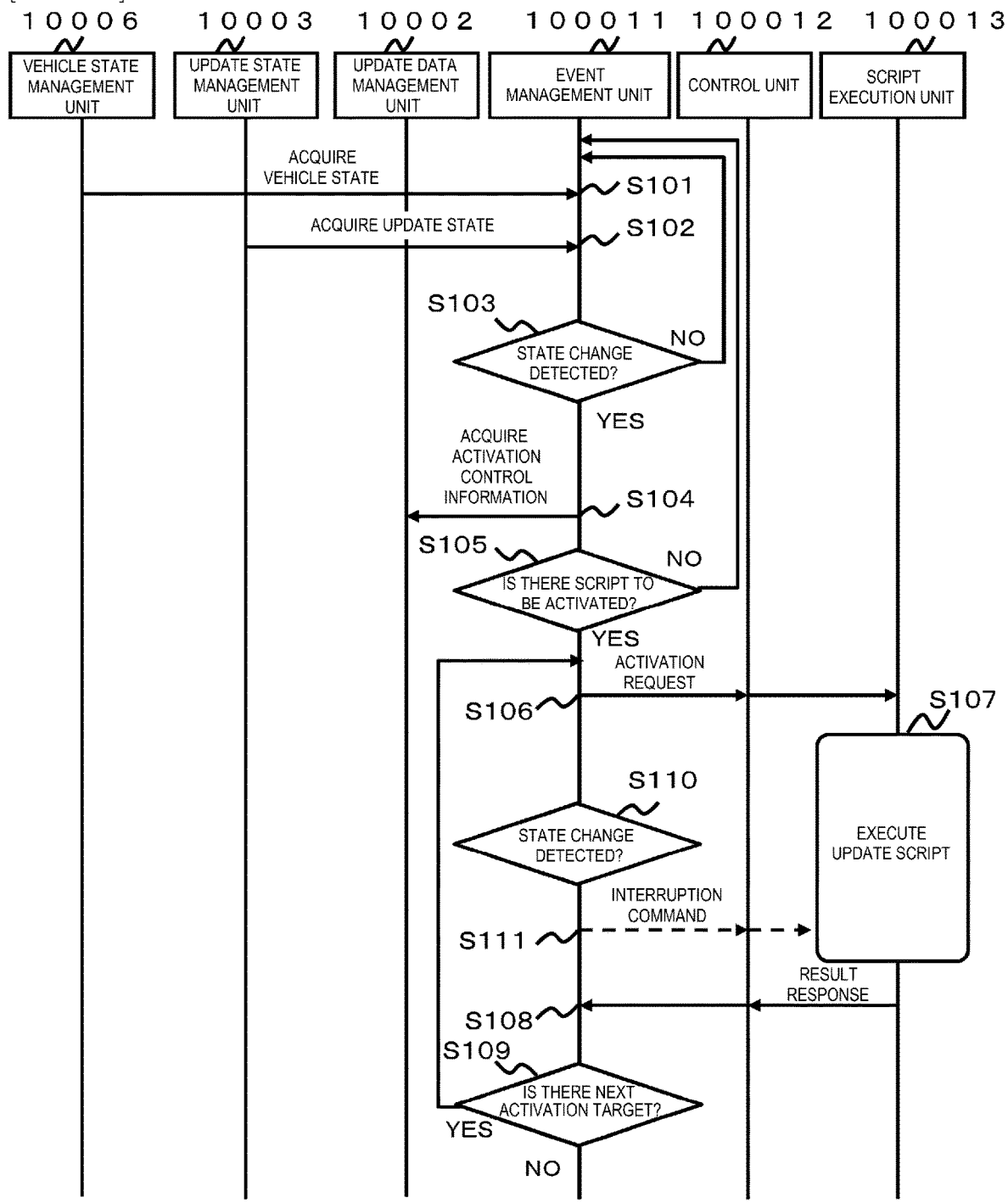

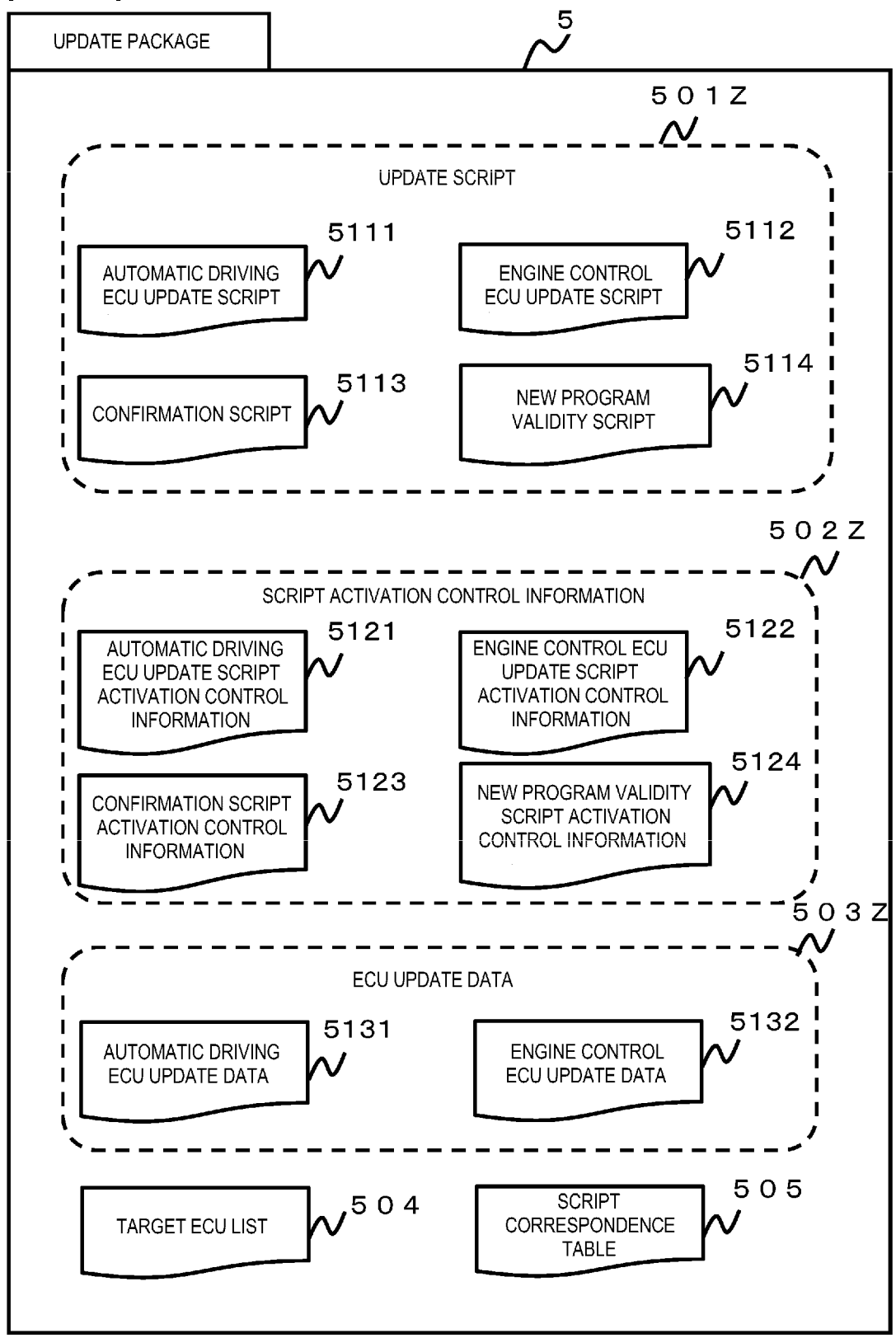
[FIG. 9]

[FIG. 10]

| TARGET SCRIPT | ACTIVATION EVENT | ACTIVATION CONDITION | | INTERRUPTION CONDITION | |
|---|---|---|---|---|---|
| | | ORDER | UPDATE STATE | INTERRUPTION EVENT | |
| AUTOMATIC DRIVING ECU UPDATE SCRIPT | DL COMPLETED | 1 | — | IGN-OFF | ⎫ 5121 |
| AUTOMATIC DRIVING ECU UPDATE SCRIPT | IGN-ON | 1 | AUTOMATIC DRIVING ECU UPDATE INCOMPLETED | IGN-OFF | ⎭ |
| ENGINE ECU UPDATE SCRIPT | IGN-OFF | 2 | — | IGN-ON | 5122 |
| CONFIRMATION SCRIPT | IGN-OFF | 1 | AUTOMATIC DRIVING ECU UPDATE COMPLETED | IGN-ON | 5123 |
| NEW PROGRAM VALIDITY SCRIPT | IGN-OFF | 3 | — | IGN-ON | 5124 |

[FIG. 11]
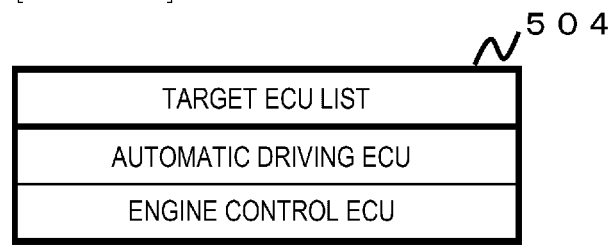

[FIG. 12]

| SCRIPT CORRESPONDENCE TABLE | | | 505 |
|---|---|---|
| UPDATE SCRIPT | ECU UPDATE DATA | TARGET ECU |
| AUTOMATIC DRIVING ECU UPDATE SCRIPT | AUTOMATIC DRIVING ECU UPDATE DATA | AUTOMATIC DRIVING ECU |
| ENGINE CONTROL ECU UPDATE SCRIPT | ENGINE CONTROL ECU UPDATE DATA | ENGINE CONTROL ECU |

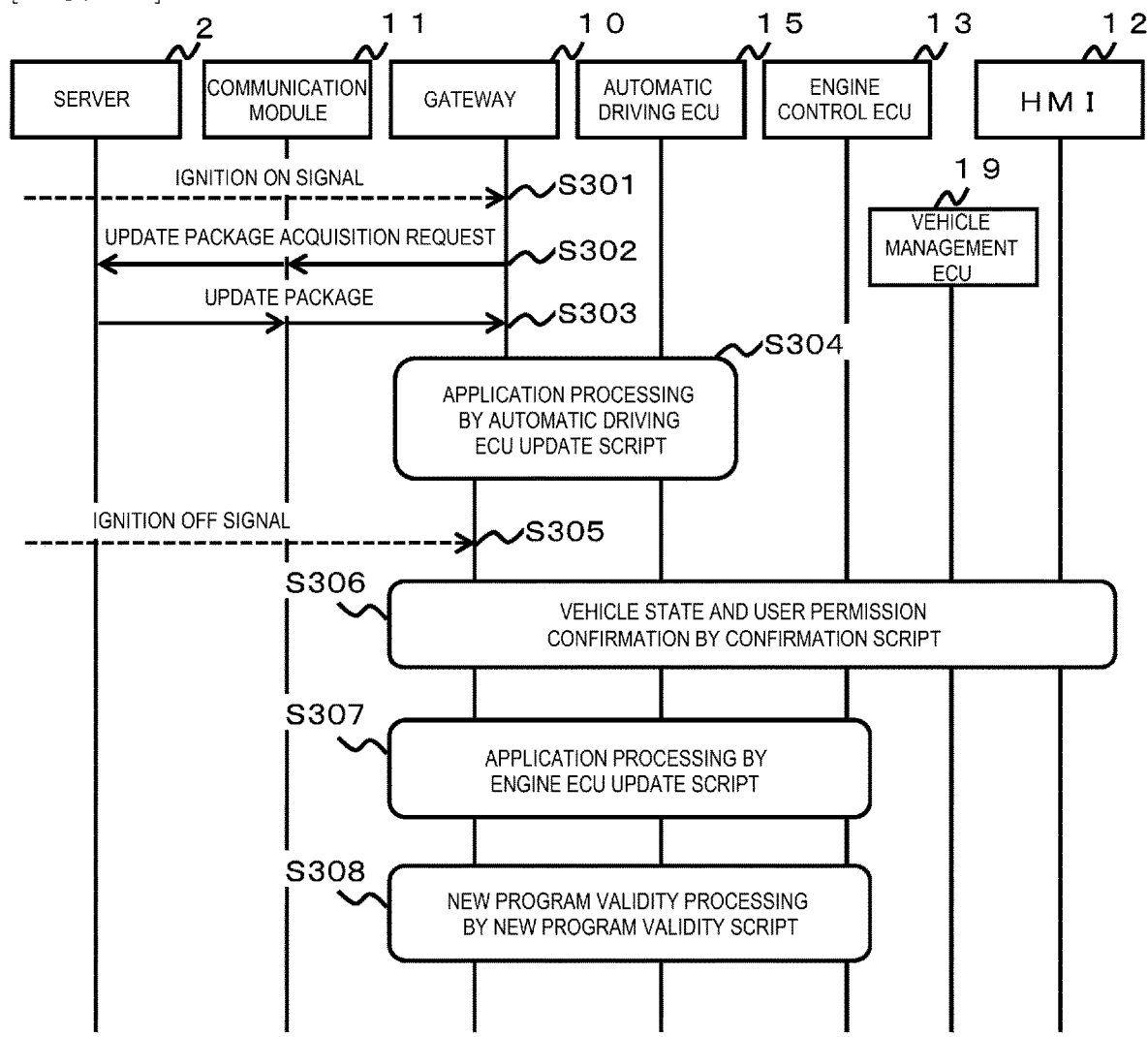

[FIG. 14]

```
1   Ret = ExecDiagService(AUTOMATIC DRIVING ECU, RequestVersion);
2   If(Version ≠ 1.00) { Goto Error Exit; }
3
4   Ret = ExecDiagService(AUTOMATIC DRIVING ECU, SessionControl, RUNNING WRITE MODE);
5   If(Ret = ERROR) { Goto Error Exit; }
6
7   RecordOTAStatus(AUTOMATIC DRIVING ECU, "START OTA");
8
9   Start_block = 1;
10  For(i=start_block; i<BLOCK NUMBER; i++) {
11    Ret = ExecDiagService(AUTOMATIC DRIVING ECU, Download, BLOCK i);
12    If(Ret = ERROR) { Goto Error Exit; }
13
14    RecordOTAStatus(AUTOMATIC DRIVING ECU, "Complete Block i");
15  }
16
17  Ret = ExecDiagService(AUTOMATIC DRIVING ECU, SessionControl, NORMAL MODE);
18  If(Ret = ERROR) { Goto Error Exit; }
19  RecordOTAStatus(AUTOMATIC DRIVING ECU, "Complete Transfer");
20
21  Return SUCCESS;
22
23  Error Exit:
24    RecordOTAStatus(AUTOMATIC DRIVING ECU, "ERROR Exit");
25    Return ERROR;
```

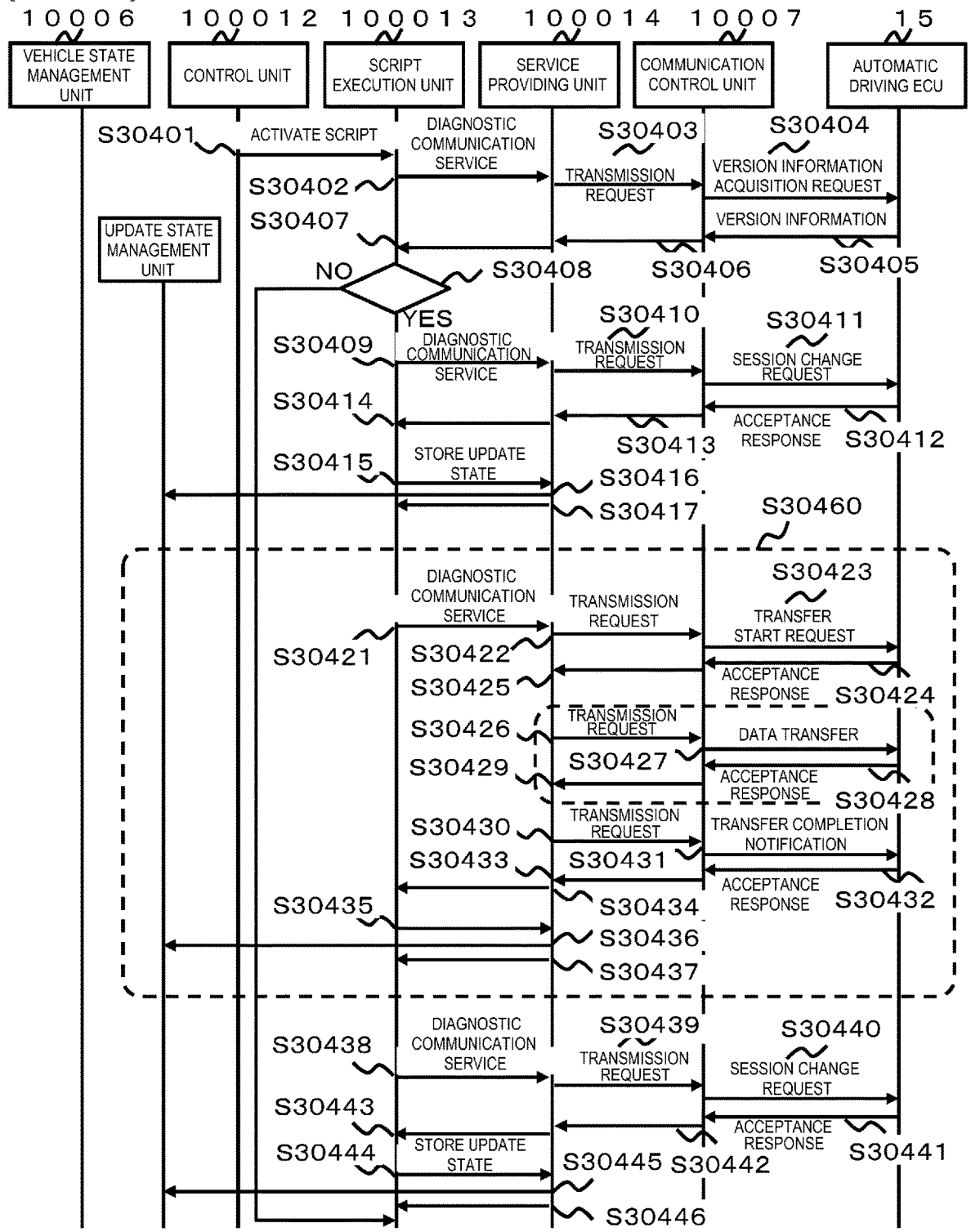
[FIG. 15]

[FIG. 16]

```
1   status = GetVehicleStatus(VEHICLE SPEED);
2     If(Status ≠ 0){ Goto Error Exit};
3
4   Ret = ExecDiagService(HMI, confirmUserApproval);
5   If(Ret = ERROR|NG){ Goto Error Exit; }
6
7   Return Success;
8
9   Error Exit:
10    Return Error;
```

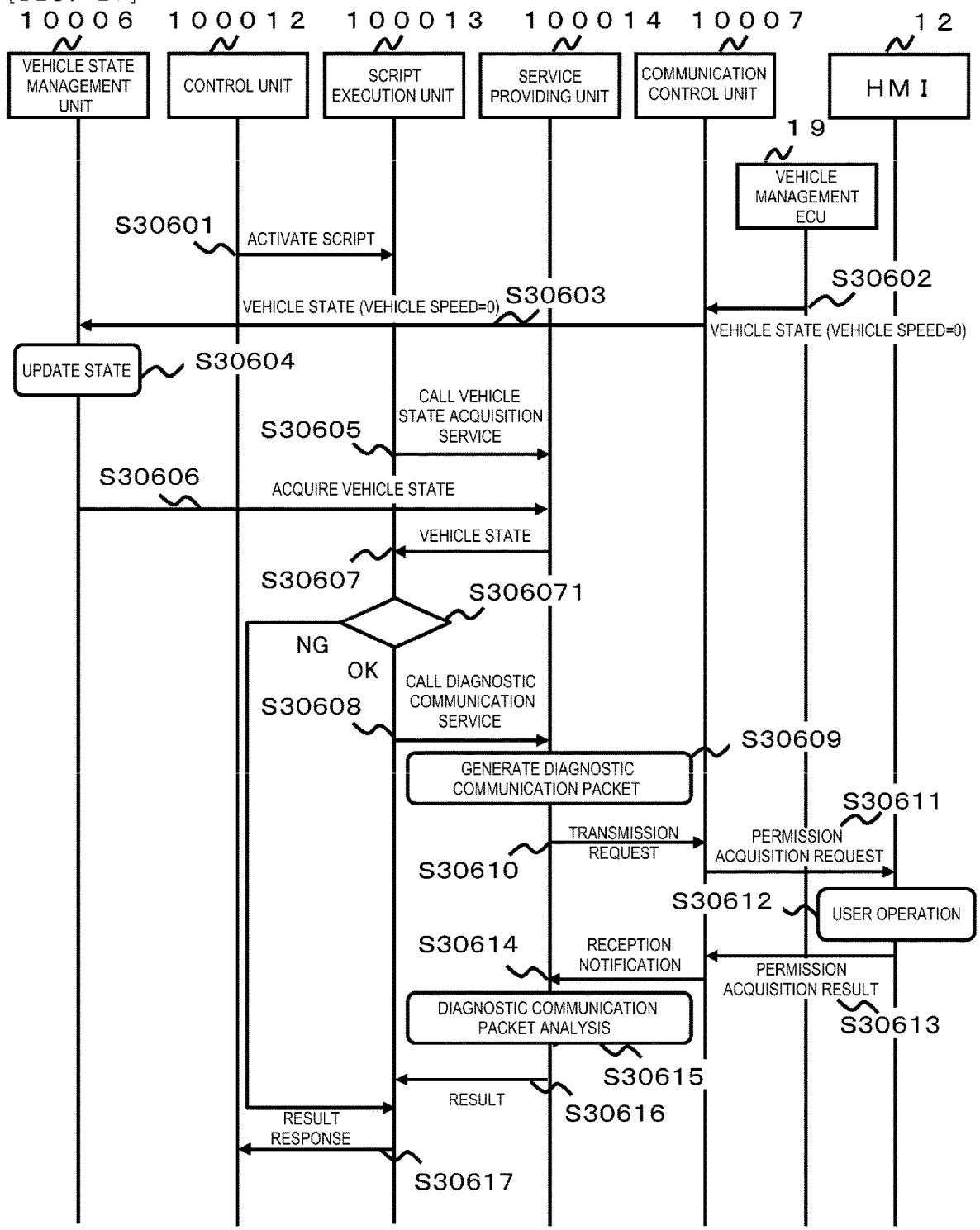

[FIG. 18]
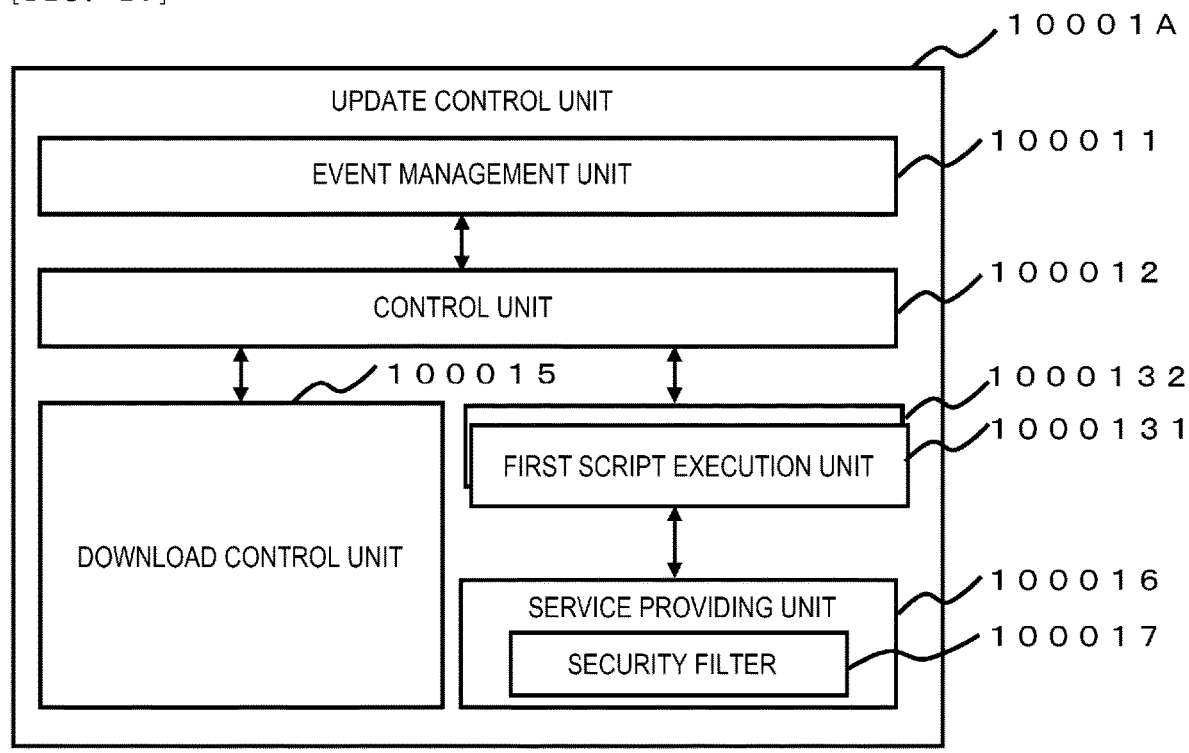

[FIG. 19]
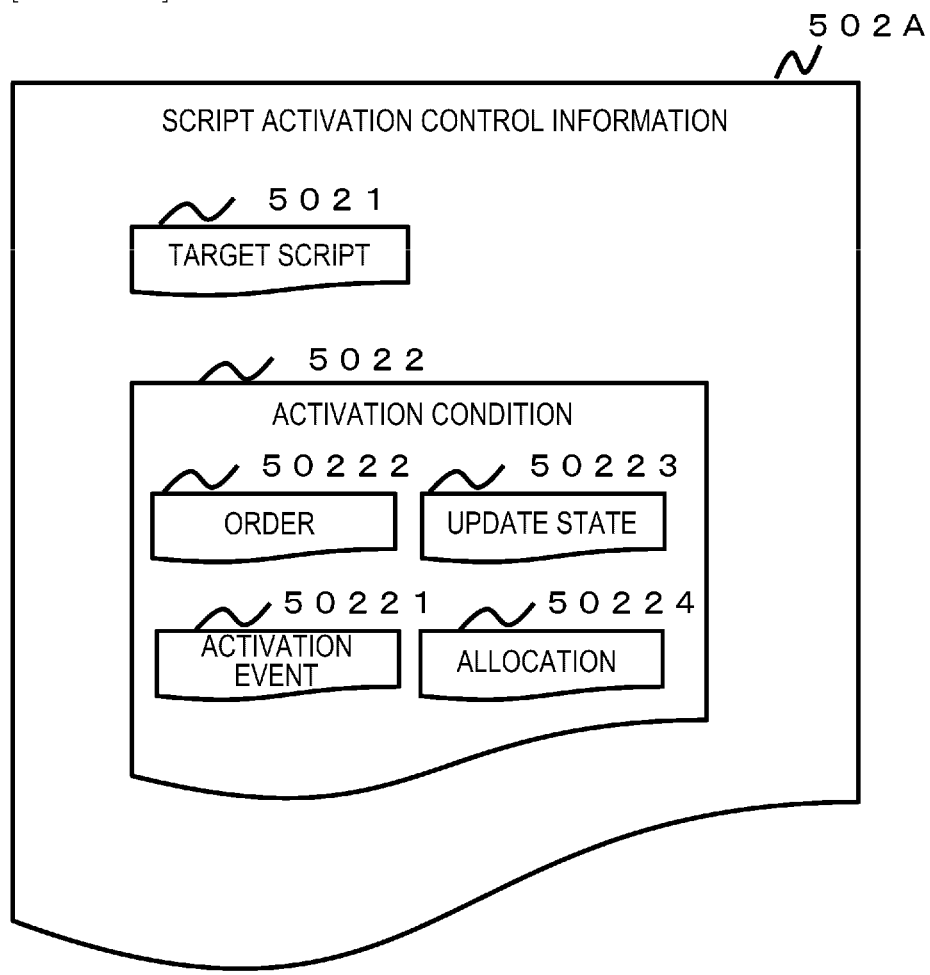

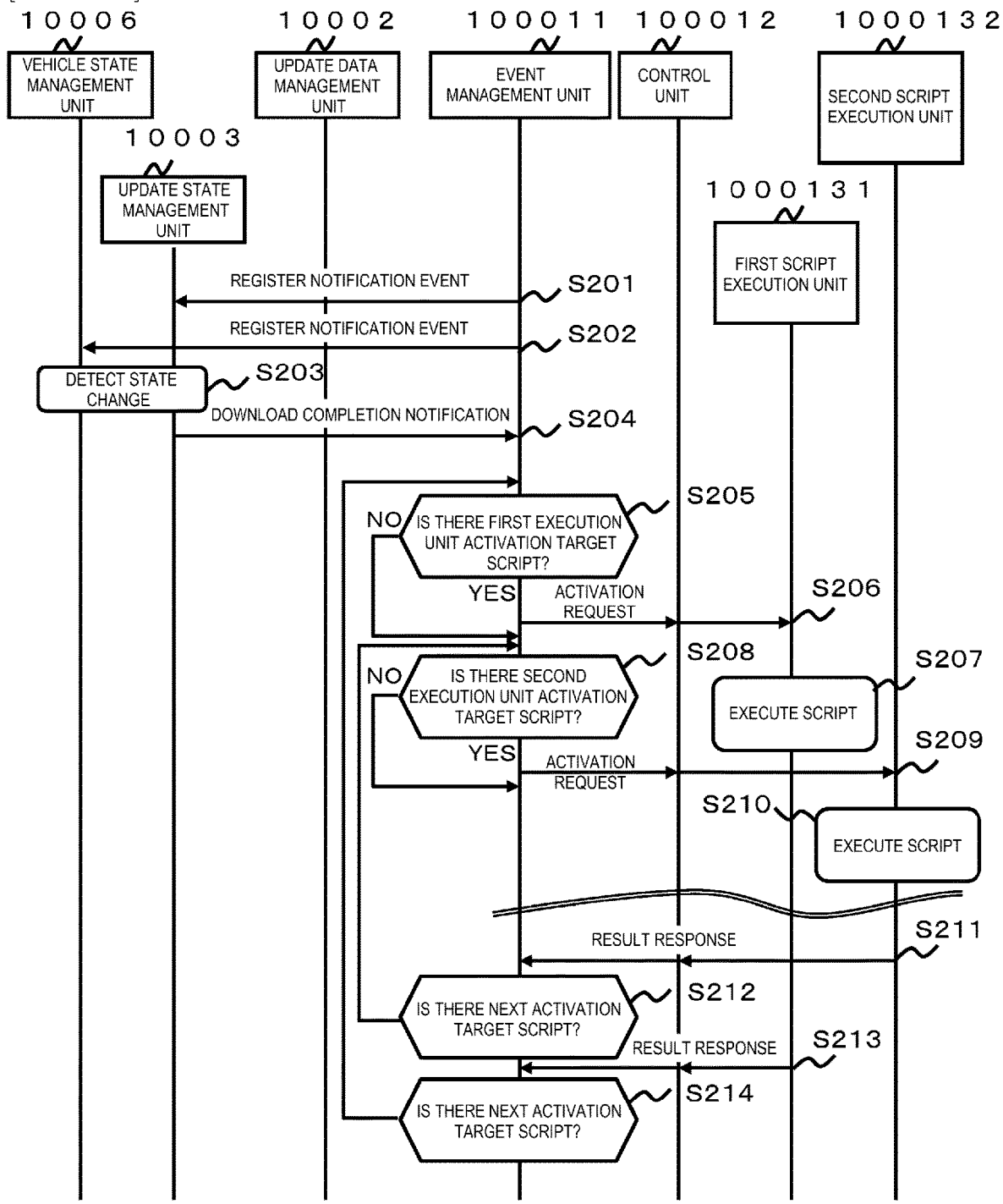

[FIG. 21]
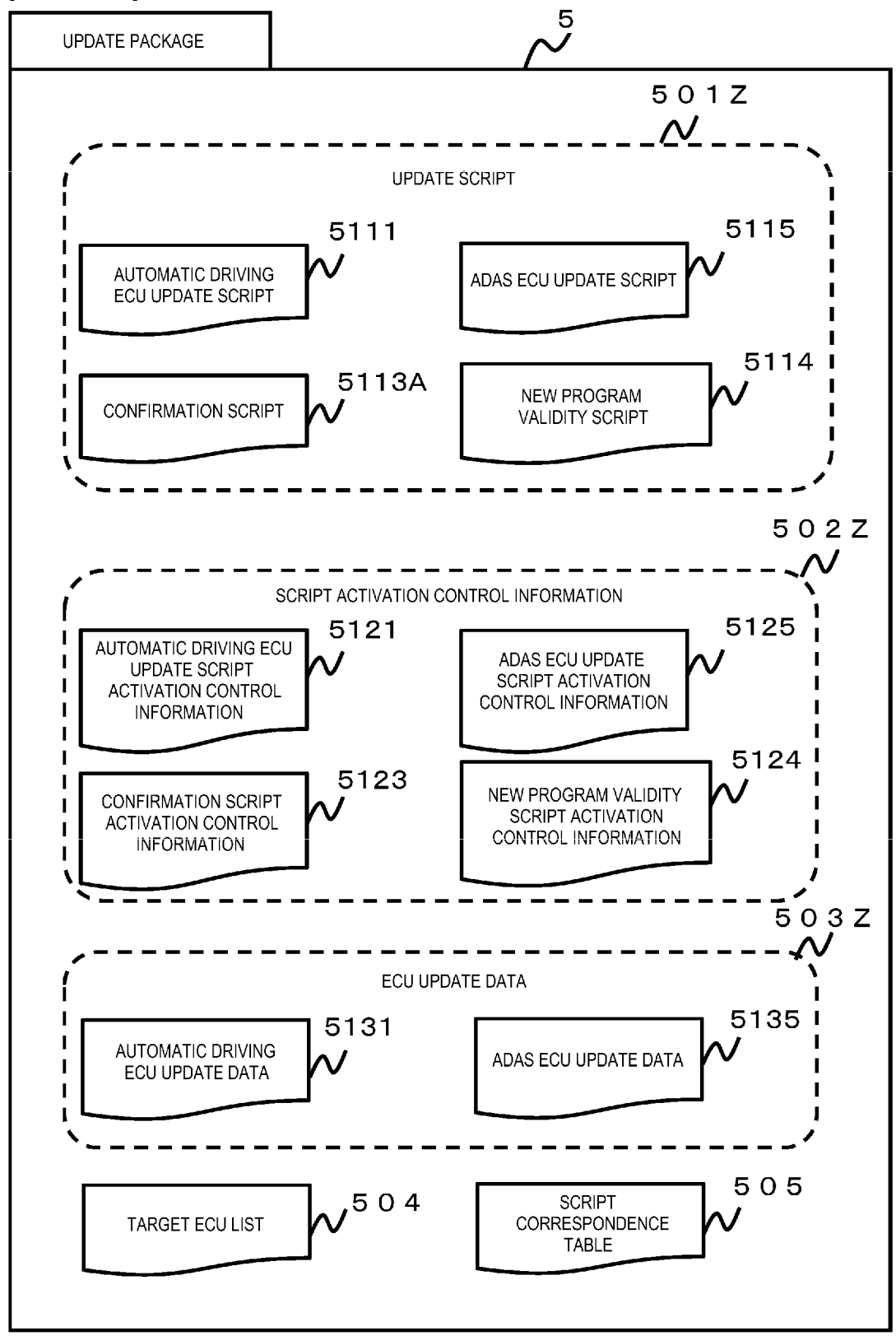

[FIG. 22]

| TARGET SCRIPT | ACTIVATION CONDITION | | | | |
|---|---|---|---|---|---|
| | ACTIVATION EVENT | ORDER | UPDATE STATE | ALLOCATION | |
| AUTOMATIC DRIVING ECU UPDATE SCRIPT | DL COMPLETED | 1 | — | FIRST | 5121 |
| AUTOMATIC DRIVING ECU UPDATE SCRIPT | IGN-ON | 1 | AUTOMATIC DRIVING ECU UPDATE NOT COMPLETED | FIRST | |
| ADAS ECU UPDATE SCRIPT | DL COMPLETED | 1 | — | SECOND | 5125 |
| ADAS ECU UPDATE SCRIPT | IGN-ON | 1 | ADAS ECU UPDATE NOT COMPLETED | SECOND | |
| CONFIRMATION SCRIPT | IGN-OFF | 1 | AUTOMATIC DRIVING ECU UPDATE COMPLETED & ADAS ECU UPDATE COMPLETED | FIRST | 5123 |
| NEW PROGRAM VALIDITY SCRIPT | IGN-OFF | 3 | — | FIRST | 5124 |

5021, 5022, 50221, 50222, 50223, 5023, 50224, 502Z

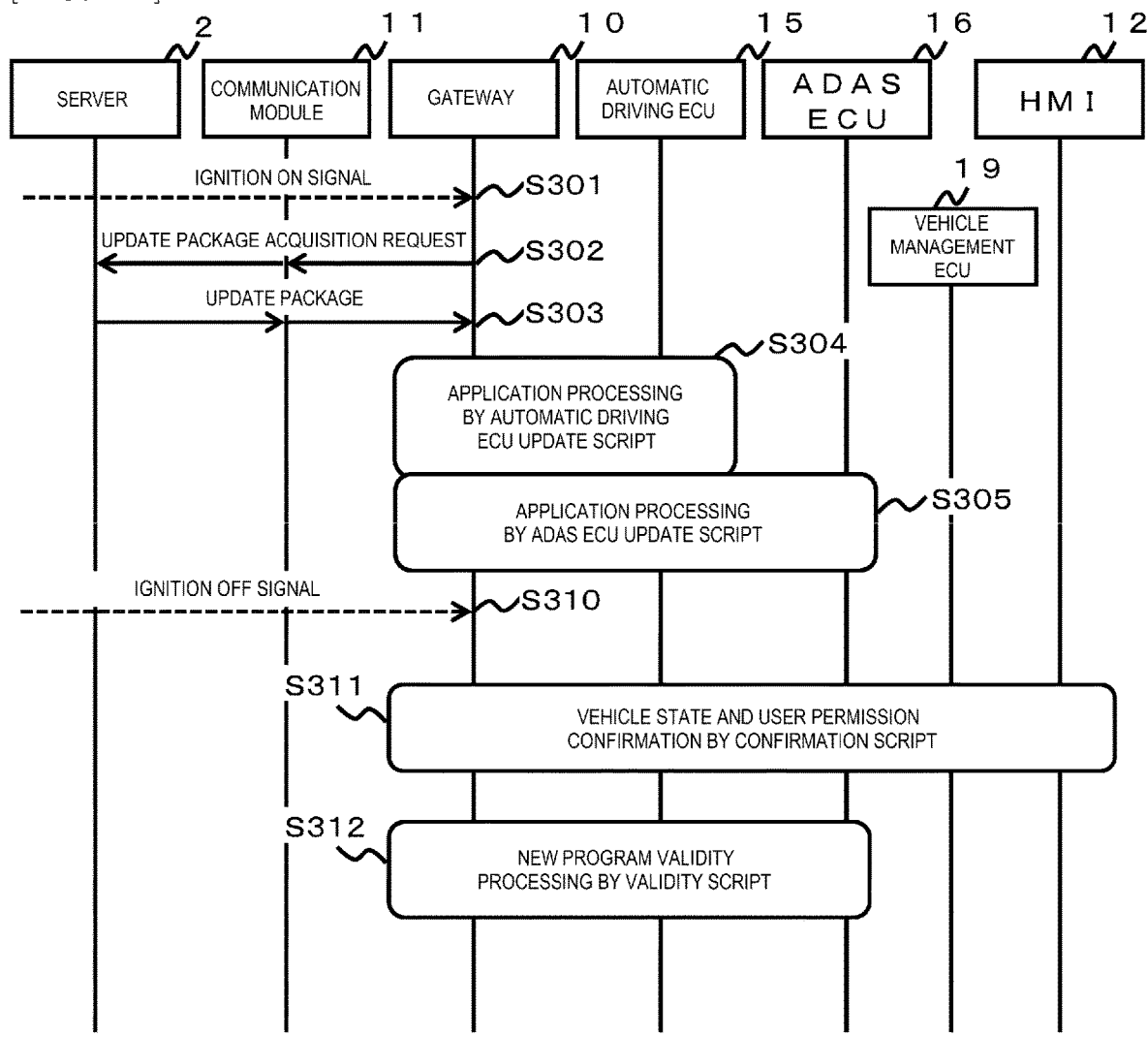
[FIG. 23]

[FIG. 24]

```
1   status = GetVehicleStatus(VEHICLE SPEED);
2     If(Status ≠ 0){ Goto Error Exit};
3
4   Ret = ExecDiagService(HMI, confirmUserApproval);
5   If(Ret = ERROR){ Goto Error Exit; }
6
7   While() {
8     Status = GetVehicleStatus(IGN);
9     If(Status = ON){ Return Success; }
10
11    Result = GetDiagServiceResult(HMI, confirmUserApproval);
12    If(Result =OK){ Return Success; }
13    Elself(Result = NG){ Return Error; }
14  }
15
16  Error Exit:
17   Return Error;
```

5113A

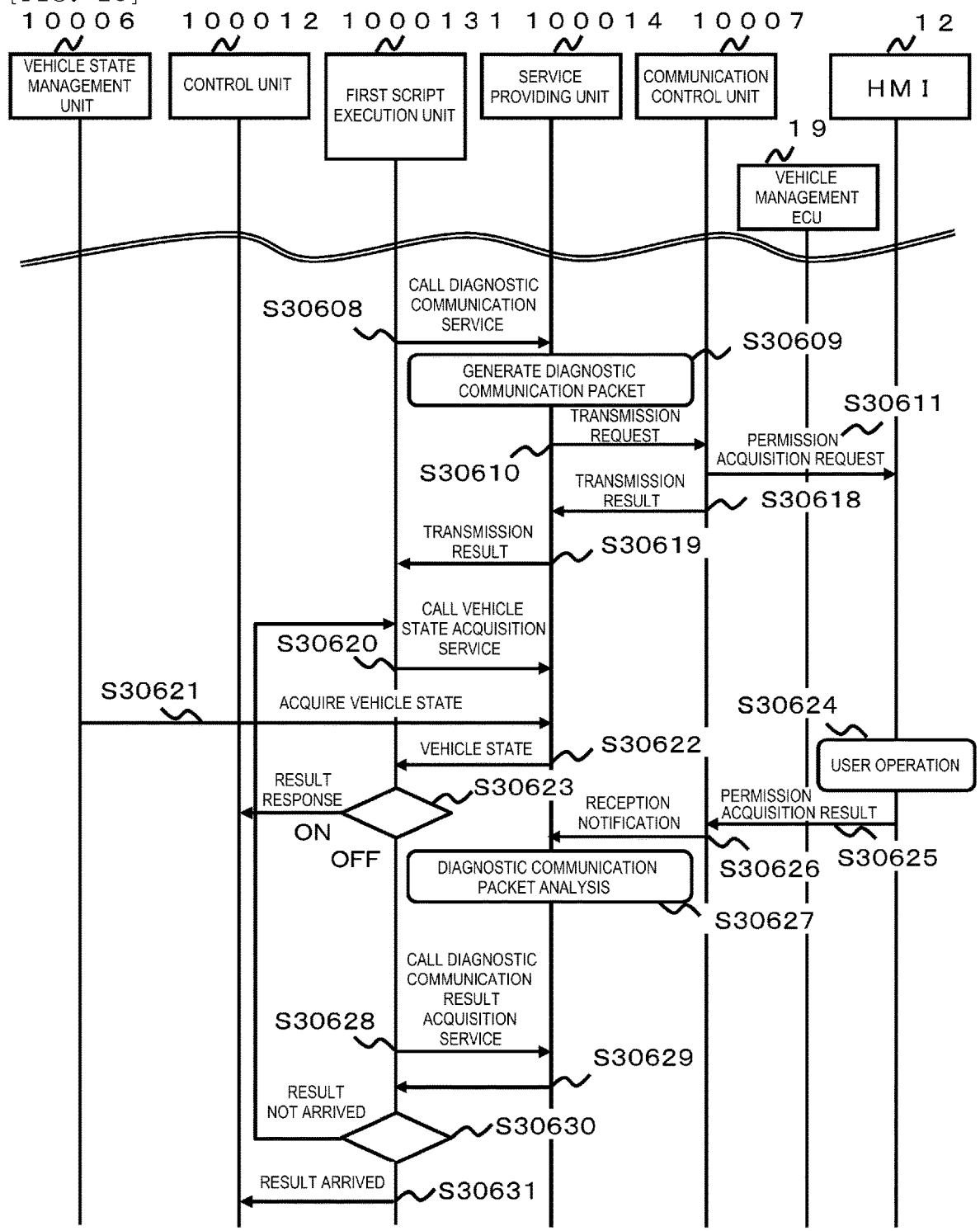

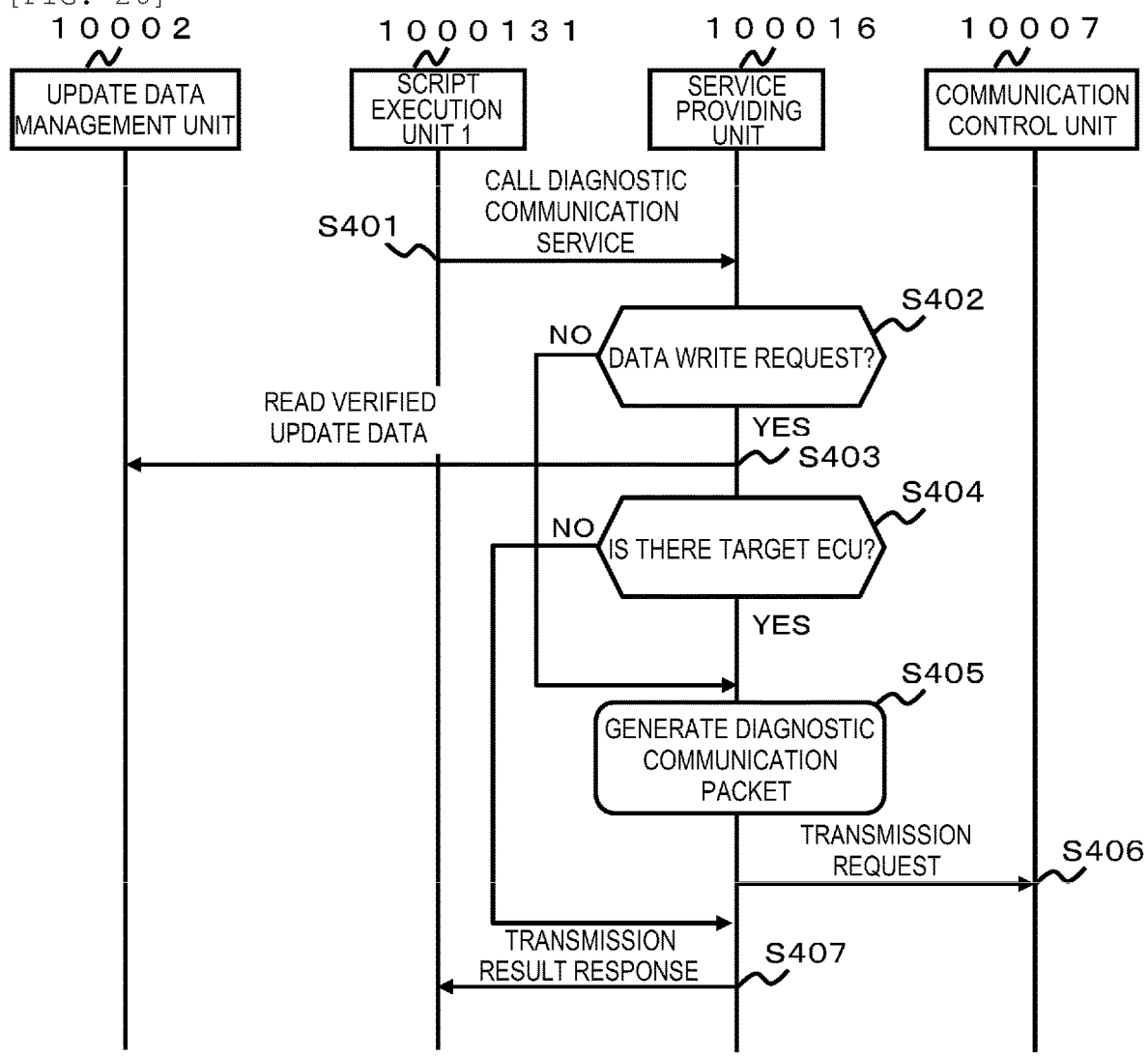

INFORMATION UPDATE APPARATUS AND INFORMATION UPDATE METHOD

TECHNICAL FIELD

The present invention relates to an information update apparatus and an information update method.

BACKGROUND ART

In recent years, with the development of driving support functions and automatic driving technology, a scale of software mounted on an Electric Control Unit (ECU) for an automobile is enlarged. Further, as the scale of the software is enlarged, not only the number of recalls caused by software problems, but also the number of ECUs that need to be dealt with each time has increased. Therefore, there is an increasing need for a technology for remotely updating software mounted on the ECU. In the case of remotely updating the software, automation of update processing is required.

Patent Literature 1 discloses a software update apparatus that connects to a server and a plurality of control apparatuses to transmit and receive data, the software update apparatus including a first communication unit that receives update control information, which includes update data and identification information for identifying an application method for applying the update data to a control apparatus, from the server for each of the plurality of control apparatuses, a second communication unit that transmits the update data applied for each of the plurality of control apparatuses, and an update control unit that controls the plurality of control apparatuses via the second communication unit in order to apply the update data based on the identification information.

CITATION LIST

Patent Literature

Patent Literature 1: JP-A-2016-170740

SUMMARY OF INVENTION

Technical Problem

In the invention described in Patent Literature 1, flexibility of update processing is insufficient.

Solution to Problem

An information update apparatus according to a first aspect of the invention is an information update apparatus that updates first information stored in a vehicle control apparatus to second information, the information update apparatus including: a download control unit that receives an update package including an update body that is a difference between the first information and the second information or the second information, procedure information including a procedure of updating the first information to the second information using the update body, and an activation condition that is a condition of starting updating the first information to the second information; and an event management unit that acquires a state of a vehicle on which the vehicle control apparatus and the information update apparatus are mounted, and causes an update execution unit to execute the update based on the procedure information when the state of the vehicle matches the activation condition.

An information update method according to a second aspect of the invention is an information update method in which a computer updates first information stored in a vehicle control apparatus to second information, the information update method including: receiving an update package including an update body that is a difference between the first information and the second information or the second information, procedure information including a procedure of updating the first information to the second information using the update body, and an activation condition that is a condition of starting updating the first information to the second information; and acquiring a state of a vehicle on which the vehicle control apparatus and the computer are mounted, and causing an update execution unit to execute the update based on the procedure information when the state of the vehicle matches the activation condition.

Advantageous Effect

According to the invention, it is possible to perform flexible update processing.

BRIEF DESCRIPTION OF DRAWINGS

FIG. 1 is a diagram showing a configuration of a software update system S according to a first embodiment.

FIG. 2 is a block diagram showing a hardware configuration of a gateway 10.

FIG. 3 is a block diagram showing a configuration of a gateway program 100.

FIG. 4 is a block diagram showing a configuration of an update control unit 10001.

FIG. 5 is a diagram showing an example of an update state D1.

FIG. 6 is a diagram showing a configuration of an update package 5 according to the first embodiment.

FIG. 7 shows a configuration example of script activation control information 502.

FIG. 8 is a sequence diagram showing operation of each component of the gateway program 100.

FIG. 9 shows a specific example of the update package 5.

FIG. 10 shows a specific example of total control information 502Z.

FIG. 11 shows a specific example of a target ECU list 504.

FIG. 12 shows a specific example of a script correspondence table 505.

FIG. 13 is a sequence diagram showing an outline of operation of an apparatus provided in a vehicle 1 according to an operation example.

FIG. 14 is a diagram showing a specific example of an automatic driving ECU update script 5111.

FIG. 15 is a sequence diagram showing operation of the gateway program 100 accompanying execution of the automatic driving ECU update script 5111.

FIG. 16 is a diagram showing a specific example of a confirmation script 5113.

FIG. 17 is a sequence diagram showing operation of the gateway program 100 accompanying execution of the confirmation script 5113.

FIG. 18 is a block diagram showing a configuration of an update control unit 10001A according to a second embodiment.

FIG. 19 is a diagram showing a configuration of script activation control information 502A.

FIG. 20 is a sequence diagram showing script activation processing.

FIG. 21 shows a specific example of the update package 5 according to the second embodiment.

FIG. 22 shows a specific example of the total control information 502Z according to the second embodiment.

FIG. 23 is a sequence diagram showing a flow of software update processing according to the second embodiment.

FIG. 24 shows a specific example of a confirmation script 5113A according to the second embodiment.

FIG. 25 is a sequence diagram showing operation of the gateway program 100 accompanying execution of the confirmation script 5113A.

FIG. 26 is a sequence diagram showing a flow of diagnostic communication service calling processing according to the second embodiment.

DESCRIPTION OF EMBODIMENTS

First Embodiment

A software update system according to a first embodiment will be described below with reference to FIGS. 1 to 17. Although the present embodiment will describe software update, an update target is no limited to software and can be applied to parameters, data, and the like. In the present embodiment, software after update is also referred to as a "new program", and software before update is also referred to as an "old program".

(System Configuration)

FIG. 1 is a diagram showing a configuration of the software update system S according to the first embodiment. The software update system S includes the vehicle 1 and a server 2. The vehicle 1 and the server 2 are connected via Internet 3 connecting to an access network or a base, and an access network 4 provided by a communication service provider.

The vehicle 1 includes the gateway 10, a communication module 11, a Human Machine Interface (HMI) 12, ECU groups necessary for the vehicle 1 to achieve functions such as running such as an engine control ECU 13, a brake control ECU 14, an automatic driving ECU 15, an advanced driving assistance system (ADAS) ECU 16, an airbag ECU 17, a Heating Ventilating Air Conditioning (HVAC) ECU 18, and a vehicle management ECU 19, and in-vehicle networks 10a and 10b connecting the ECU groups. The present embodiment will describe an example in which control programs of the engine control ECU 13 and the automatic driving ECU 15 are updated.

An in-vehicle network includes a Control Area Network (CAN) (registered trademark), a Local Interconnect Network (LIN), a FlexRay, and an Ethernet (registered trademark). In the present embodiment, the in-vehicle network 10b is constituted by the CAN and the in-vehicle network 10a is constituted by the Ethernet. Although not shown in FIG. 1, each component in the vehicle such as various ECUs is connected to a storage battery by a power line and is supplied with electric power. However, the configuration of the in-vehicle networks shown here is an example, and the type and number of networks are not limited thereto.

The gateway 10 relays communication data between various ECUs and, as a software update apparatus, updates software mounted on the gateway 10 and the ECUs connected via the in-vehicle networks. That is, the present embodiment will describe operation of the gateway 10 in detail. The gateway 10 requests the server 2 for the update package 5 necessary for software update every time the gateway 10 is activated, that is, each time ignition of the vehicle 1 is turned ON. When there is information to be updated, the server 2 transmits the update package 5 to the gateway 10. A configuration of the update package 5 will be described below.

The communication module 11 relays communication between the gateway 10, the HMI 12, various ECUs, and the server 2. The HMI 12 is an apparatus for receiving information presentation to a user who is an occupant of the vehicle 1 and input from the user, which includes a display device that displays a screen and an input device such as various switches, or a touch panel combining these devices, or the like. The engine control ECU 13 controls an engine. The brake control ECU 14 controls a brake. The automatic driving ECU 15 performs an environment recognition, an instruction to activate the vehicle 1, and the like during automatic driving. The ADAS ECU 16 performs driving support control such as automatic braking. The airbag ECU 17 controls an airbag. The HVAC ECU 18 performs air conditioning control in the vehicle. The vehicle management ECU 19 manages a vehicle state.

The server 2 includes a CPU, a ROM, and a RAM (not shown), and transmits the update package 5 necessary for software update to the gateway 10. The gateway 10 updates software of each ECU based on data included in the update package 5.

(Configuration of Gateway)

FIG. 2 is a block diagram showing a hardware configuration of the gateway 10. The gateway 10 includes a microcomputer 101, a FlashROM (FROM) 102, a communication I/F 104 for CAN, and a communication I/F 105 for Ethernet. The microcomputer 101 includes a CPU 1011, an SRAM 1012, a FROM 1013, a CAN communication controller 1014, and an Ethernet communication controller 1015. The CPU 1011 of the microcomputer 101 executes a program stored in the FROM 1013, controls other components in the gateway 10, and performs an instruction for data transmission and reception with other machines connected by the in-vehicle networks, thereby causing the gateway 10 to function.

The FROM 102 is a nonvolatile memory and stores the received update package 5. The communication I/F 104 is an interface for CAN communication and transmits data to an ECU connected to the in-vehicle network 10b and receives data from the ECU via the in-vehicle network 10b based on an instruction from the microcomputer 101. The communication I/F 105 is an interface for Ethernet communication, and transmits data to a machine connected to the in-vehicle network 10a and receives data from the machine via the in-vehicle network 10a based on an instruction from the microcomputer 101.

FIG. 3 is a block diagram showing a configuration of the gateway program 100 that operates on the gateway 10. The gateway program 100 that achieves functions of the gateway 10 is stored in the FROM 1013 of the microcomputer 101 and executed by the CPU 1011. In FIG. 3, a functional group is represented as a block and each block may be divided into a plurality of blocks, or a part of blocks may be integrated. Further, a control program may be implemented by a single piece of software, or implemented by a combination of two or more pieces of software.

The gateway program 100 includes the update control unit 10001, an update data management unit 10002, an update state management unit 10003, a vehicle state management unit 10006, and a communication control unit 10007.

The update control unit 10001 communicates with a machine connected to the in-vehicle network 10a via the communication control unit 10007, acquires the update package 5, transmits a state of the vehicle, and transmits a status of software update processing. The update package 5 acquired by the update control unit 10001 is stored in the FROM 102. The configuration of the update package will be described later. The update control unit 10001 communicates with an ECU connected to the in-vehicle network 10b via the communication control unit 10007 and controls the ECU to update software mounted on the ECU. As will be described in detail below, software update is performed based on the update package 5 acquired via the update data management unit 10002 and a vehicle system state acquired via the vehicle state management unit 10006.

The update data management unit 10002 acquires the update package 5 from the FROM 102 and provides the update package 5 to the update control unit 10001. The update state management unit 10003 acquires an update state from the update control unit 10001 and stores the update state in the FROM 1013 as an update state D1. In addition, the stored update state D1 is provided to the update control unit 10001. The vehicle state management unit 10006 communicates with machines connected to the in-vehicle networks 10a and 10b via the communication control unit 10007, acquires the state of the vehicle system, and provides the vehicle state to the update control unit 10001. The vehicle state is, for example, ON and OFF of the ignition and start of running.

The communication control unit 10007 controls the CAN communication controller 1014 and the Ethernet communication controller 1015 in accordance with an instruction from the update control unit 10001 and the like, and communicates with a machine connected to the in-vehicle networks 10a and 10b. When communicating with a machine connected to the in-vehicle network 10a, the communication control unit 10007 analyzes and generates a packet such as TCP/IP and UDP/IP. When communicating with a machine connected to the in-vehicle network 10a, the communication control unit 10007 analyzes and generates a CAN frame.

FIG. 4 is a block diagram showing a configuration of the update control unit 10001 which is one of functions achieved by the gateway 10 executing a program. The update control unit 10001 includes an event management unit 100011, a control unit 100012, a script execution unit 100013, a service providing unit 100014, and a download control unit 100015. However, a script in the present embodiment is an operation command to the gateway 10 and the script includes a conditional expression, a control statement, and a command execution command. The script in the present embodiment is a text file interpreted by an interpreter such as a shell script, Perl, or Python.

The event management unit 100011 detects an event such as a state change of the vehicle 1 or download completion, and transmits occurrence of the event to the control unit 100012. The control unit 100012 performs an execution instruction of a script to the script execution unit 100013 and a download start instruction to the download control unit 100015 in accordance with the occurrence of the event transmitted from the event management unit 100011. The script execution unit 100013 analyzes and executes the script instructed from the control unit 100012. When receiving an interruption command from the control unit 100012, the script execution unit 100013 interrupts the execution of the script.

The service providing unit 100014 records and reads vehicle state acquisition and an update state to the script execution unit 100013, and provides services such as a diagnostic communication function. A diagnostic communication service generates and analyzes a command conforming to a diagnostic communication protocol such as Universal Diagnostic Service (UDS). In addition, the diagnostic communication service transmits a command generated via the communication control unit 10007 and receives a response. The download control unit 100015 communicates with the communication module 11 connected to the in-vehicle network 10a via the communication control unit 10007, and acquires the update package 5 from the server 2.

In this way, the event management unit 100011 detects a change in the vehicle state or the update state as an event, and determines whether the script is activated, thereby starting execution of necessary processing at an arbitrary timing. In addition, by acquiring and recording the update state managed outside the update control unit 10001 via the service providing unit 100014, write and read to a nonvolatile memory or the like which is difficult to directly access from the script can be appropriately performed.

(Update State D1)

FIG. 5 is a diagram showing an example of the update state D1 managed by the update state management unit 10003 of the gateway 10. FIG. 5 shows an example in which the update state D1 is managed as a table and an update state for each ECU is recorded. The update state D1 includes fields of an ECU ID D101, an update start state D102, and a completion block D103. The ECU ID D101 is a field in which information for identifying an ECU is stored. The update state D102 is a field in which identification information indicating whether update processing of the ECU is started is stored, for example, "NOT STARTED", "STARTED", or "UPDATE COMPLETED" is stored. The completion block D103 is a field in which identification information of a block whose processing is succeeded, for example, a block number, is stored.

A first record indicated by a reference sign D11 is a record indicating an update state of the automatic driving ECU 15. "AUTOMATIC DRIVING ECU" is stored in the field of the ECU ID D101 of the record, "STARTED" indicating that the update processing is in progress is stored in the field of the update start state D102, and "Block n" indicating that a final processed block is a block n is stored in the field of the completion block D103.

A second record indicated by a reference sign D12 is a record indicating an update state of the engine control ECU 13. "ENGINE CONTROL ECU" is stored in the field of the ECU ID D101 of the record, "NOT STARTED" indicating that the update processing is not started is stored in the field of the update start state D102. Here, since the update of the engine control ECU 13 is not started, no value is set in the field of the completion block D103.

Although two records are described here, records are created in the following case. That is, the records are created when the update package 5 received by the gateway 10 is described as an ECU to be updated. The update state D1 is sequentially recorded as will be described later. In this way, by sequentially recording the update state D1, it is possible for the update to be interrupted before being completed after the update is restored to normal and activated after being interrupted, and it is possible to start appropriate processing by recognizing a location where the update is interrupted.

(Update Package 5)

FIG. 6 is a diagram showing a configuration of the update package 5 acquired by the gateway 10 from the server 2. The update package 5 includes one or a plurality of update scripts 501, one or a plurality of pieces of script activation control information 502, one or a plurality of pieces of ECU update data 503, a target ECU list 504, and a script correspondence table 505. All the update scripts 501 included in the update package 5 are collectively referred to as a total script 501Z. All the script activation control information 502 included in the update package 5 is collectively referred to as the total control information 502Z. All the ECU update data 503 included in the update package 5 is collectively referred to as total update data 503Z.

One or more update scripts 501 exist in the update package 5. A procedure necessary for software update is described in the update script 501. The number of the update scripts 501 included in the update package 5 is equal to or larger than the number of ECUs to be updated. The update script 501 is described in a form executable by the script execution unit 100013. Processing described as a script, that is, the procedure necessary for the update includes, for example, a type and an order of control commands to be transmitted to the ECU to be updated, confirmation of the vehicle state, permission acquisition to the user, recovery processing for each ECU, and validity processing of the updated software.

One or more pieces of the script activation control information 502 exist in the update package 5. The script activation control information 502 is included in the update package 5 at the same number of pieces as the number of the update scripts 501, and corresponds to the respective update scripts 501. The script activation control information 502 describes control of the update script 501, that is, information necessary for activation and interruption. Details of the script activation control information 502 will be described later.

One or more pieces of the ECU update data 503 exist in the update package. In the ECU update data 503, data necessary for software update is stored. Specifically, the ECU update data 503 is metadata indicating address information of a write destination, or difference data between software itself, compressed software, or new and old software. The ECU update data 503 is a so-called update body, and other information included in the update package 5 exists to support software update using the ECU update data 503 that is the update body. The number of pieces of ECU update data 503 included in the update package 5 is the same as the number of ECUs to be updated.

One target ECU list 504 exists in the update package 5. The target ECU list 504 stores information indicating a list of ECUs to be updated by the update package 5. One script correspondence table 505 exists in the update package 5. The script correspondence table 505 stores information indicating correspondence between the update script 501, the ECU update data 503, and the ECU to be updated.

In this way, by including the script activation control information 502 in the update package 5, it is possible to perform control so that necessary processing is activated at a necessary timing.

FIG. 7 shows a configuration example of the script activation control information 502. The script activation control information 502 includes a target script 5021, an activation condition 5022, and an interruption condition 5023. The activation condition 5022 includes an activation event 50221, an order 50222, and an update state 50223. The interruption condition 5023 is constituted by an interruption event 50231. The activation condition 5022 and the interruption condition 5023 may include other components.

The target script 5021 indicates the update script 501 to be activated by the script activation control information 502. The activation event 50221 indicates an event that is a trigger to activate the update script 501 specified in the target script 5021. The event referred to here is a change in the vehicle state such as ON and OFF of the ignition, start of running of the vehicle 1, completion of download, and the like. The interruption event 50231 indicates an event that is a trigger to interrupt execution of the update script 501 specified in the target script 5021. The order 50222 indicates an activation order when a plurality of scripts are activated for one event. The update state 50223 indicates an update state for determining whether or not to activate the script when the event occurs.

In this way, by including the activation event 50221 corresponding to the change in the vehicle state and the update state in the script activation control information 502, it is possible to define to activate necessary processing at a necessary timing. By including the interruption event 50231 in the script activation control information 502, it is possible to define to interrupt the script executed at a necessary timing in accordance with a change in the vehicle state or the like. Further, by including the order 50222 in the activation condition 5022 in the script activation control information 502, it is possible to perform appropriate control when it is desired to activate a plurality of scripts in one event. Further, by including the update state 50223 in the activation condition 5022, an appropriate script can be activated according to the progress of the update.

(Sequence Diagram)

FIG. 8 is a sequence diagram showing operation of each component of the gateway program 100 in software update. A sequence diagram showing operation of the update script 501 will be described below.

In order to monitor the state of the vehicle 1, the event management unit 100011 acquires a vehicle state and an update state from the vehicle state management unit 10006 and the update state management unit 10003 respectively (S101, S102). When a state change is detected as a result of the state acquisition (YES in S103), the event management unit 100011 reads the script activation control information 502 included in the update package 5 via the update data management unit 10002 (S104). The state change includes, for example, that the ignition changes from OFF to ON, the ignition changes from ON to OFF, and download of the update package 5 is completed.

Next, the event management unit 100011 searches whether or not there is a script to be activated corresponding to the detected event in the read script activation control information 502 (S105). When there is the update script 501 to be activated (YES in S105), the event management unit 100011 confirms the order 50222 and the update state 50223 of the activation condition 5022. The event management unit 100011 issues an activation request to the script execution unit 100013 via the control unit 100012 so as to execute the update script 501 that matches the update state in the specified order (S106). The script execution unit 100013 executes the specified update script 501 (S107), and returns a response to the event management unit 100011 via the control unit 100012 (S108).

The event management unit 100011 confirms whether or not the update script 501 to be activated next exists based on the execution result and the acquired script activation control information (S109). When there is the script to be activated, the event management unit 100011 activates the next update script 501 (YES in S109). When there is no next activation target (NO in S109), the processing ends. The event management unit 100011 monitors the vehicle state and the update state even when the script execution unit 100013 executes the update script 501, and detects an interruption event included in activation control information (S110). When the interruption event 50231 is detected, an interruption command is output to the script execution unit 100013 via the control unit 100012 (S111).

In this way, by detecting a change event in the vehicle state or the update state by the event management unit 100011 and activating the update script 501, execution of necessary processing can be started at an arbitrary timing. Further, the event management unit 100011 detects the change event of the vehicle state or the update state, and determines to interrupt the execution of the update script 501, so that necessary processing can be interrupted at an arbitrary timing. Further, by including the activation event 50221 and the interruption event 50231 in the script activation control information 502 acquired from the server 2 together with the update script 501, an event that triggers updating can be changed for each update content.

Further, by including the order 50222 in the activation condition 5022 and activating the update script 501 based on the order 50222, the plurality of update scripts 501 can be activated in an appropriate order by being triggered by a single event. Although the state is continuously read here, the event management unit 100011 may register the state change to be notified to the vehicle state management unit 10006 and the update state management unit 10003 in advance. In this case, the vehicle state management unit 10006 and the update state management unit 10003 notify the event management unit 100011 of an event based on registered information.

OPERATION EXAMPLE

Hereinafter, an operation example when the automatic driving ECU 15 and the engine control ECU 13 are updated will be described with reference to FIGS. 9 to 17. Here, the automatic driving ECU 15 is constituted by a 2-sided ROM and can perform write even when the vehicle 1 is running. On the other hand, the engine control ECU 13 cannot perform write during engine control, that is, during running of the vehicle 1, and can perform write only after the ignition is turned OFF.

When the gateway 10 receives the update package 5, the automatic driving ECU 15 immediately writes new software based on an operation command of the gateway 10, and validates the new software upon receiving a validity command from the gateway 10. The engine control ECU 13 does not immediately execute update even if the gateway 10 receives the update package 5. When the ignition of the vehicle 1 is turned OFF, the gateway 10 causes the engine control ECU 13 to start updating the software.
(Operation Example|Update Package 5)

FIG. 9 shows a specific example of the update package 5 in the operation example. As described above, the update package 5 includes one or a plurality of update scripts 501, one or a plurality of pieces of script activation control information 502, one or a plurality of pieces of ECU update data 503, the target ECU list 504, and the script correspondence table 505. In the example shown in FIG. 9, each of the automatic driving ECU update script 5111, an engine control ECU update script 5112, the confirmation script 5113, and a new program validity script 5114 is the update script 501. Each of automatic driving ECU update script activation control information 5121, engine control ECU update script activation control information 5122, confirmation script activation control information 5123, and new program validity script activation control information 5124 is the script activation control information 502. Further, each of automatic driving ECU update data 5131 and engine control ECU update data 5132 is the ECU update data 503.

The automatic driving ECU update script 5111 is a script in which a procedure for writing a new program to the automatic driving ECU 15 using the automatic driving ECU update data 5131 is described. Specifically, a procedure for transferring a new program from the gateway 10 to the automatic driving ECU 15 using diagnostic communication and writing the new program in the automatic driving ECU 15 is described. The engine control ECU update script 5112 is a script in which a procedure for writing a new program to the engine control ECU 13 using the engine control ECU update data 5132 is described. Specifically, a procedure for transferring a new program from the gateway 10 to the engine control ECU 13 using diagnostic communication and writing the new program in the engine control ECU 13 is described.

The confirmation script 5113 is a script in which a procedure for confirming whether or not write to the engine control ECU 13 or execution of validity of a new program is possible is described. Specifically, a procedure for confirming whether or not the vehicle 1 is stopped, that is, whether or not a vehicle speed is zero, and whether or not the user permits the validity of the new program is described. The new program validity script 5114 is a script in which a procedure necessary for operating a new program at next activation after the new program is written to the automatic driving ECU 15 and the engine control ECU 13 is described. Specifically, a step of issuing a new program validity command to the automatic driving ECU 15 and the engine control ECU 13 is described.

The automatic driving ECU update data 5131 is data necessary for software update of the automatic driving ECU 15 and includes metadata describing a write destination address and the like, a program written in the automatic driving ECU 15, and difference data generated from a new program. The engine control ECU update data 5132 is data necessary for software update of the engine control ECU 13 and includes metadata describing a write destination address and the like, a program written in the engine control ECU 13, and difference data generated from a new program.

The automatic driving ECU update script activation control information 5121, the engine control ECU update script activation control information 5122, the confirmation script activation control information 5123, and the new program validity script activation control information 5124 constituting the script activation control information 502 describe information necessary for activating and interrupting the automatic driving ECU update script 5111, the engine control ECU update script 5112, the confirmation script 5113, and the new program activation script 5114, respectively. This will be described in detail with reference to the drawings.
(Operation Example|Script Activation Control Information 502)

FIG. 10 is a diagram showing an example of the total control information 502Z when an update target is the automatic driving ECU 15 and the engine control ECU 13, that is, all the script activation control information 502 included in the update package 5. Here, in order to ensure a list, the total control information 502Z is shown as a table. That is, a plurality of records are described in FIG. 10, which correspond to the automatic driving ECU update script activation control information 5121, the engine control ECU update script activation control information 5122, the confirmation script activation control information 5123, and the new program validity script activation control information 5124 in order from the top.

The configuration of each piece of script activation control information 502 shown in FIG. 10 is similar to that shown in FIG. 7. That is, each piece of script activation control information 502 includes the target script 5021, the activation condition 5022, and the interruption condition 5023. The activation condition 5022 includes the activation event 50221, the order 50222, and the update state 50223. The interruption condition 5023 is constituted by the interruption event 50231. However, since two conditions are set for only the automatic driving ECU update script activation control information 5121, over two rows are described in FIG. 10.

A first record in FIG. 10, that is, first information stored in the automatic driving ECU update script activation control information 5121 is as follows. "AUTOMATIC DRIVING ECU UPDATE SCRIPT" is stored in the field of the target script 5021. "DL COMPLETED" indicating download completion of the update package is stored in the field of the activation event 50221. "1" indicating first activation at the time of the event is stored in the field of the order 50222. "-" indicating activation regardless of the update state is stored in the field of the update state 50223. "IGN-OFF" indicating a timing at which an ignition signal is turned OFF is stored in the field of the interruption event 50231.

A second record in FIG. 10, that is, second information stored in the automatic driving ECU update script activation control information 5121 is as follows. "AUTOMATIC DRIVING ECU UPDATE SCRIPT" is stored in the field of the target script 5021. "IGN-ON" indicating a timing at which the ignition is turned ON is stored in the field of the activation event 50221. "1" indicating first activation at the time of the event is stored in the field of the order 50222. "AUTOMATIC DRIVING ECU UPDATE INCOMPLETED" indicating that data transfer to the automatic driving ECU 16 by the automatic driving ECU update script is incompleted is stored in the field of the update state 50223. "IGN-OFF" is stored in the field of the interruption event 50231.

A third record in FIG. 10, that is, information stored in the engine control ECU update script activation control information 5122 is as follows. "ENGINE CONTROL ECU UPDATE SCRIPT" is stored in the field of the target script 5021. "IGN-OFF" is stored in the field of the activation event 50221. "2" indicating second activation at the time of the event is stored in the field of the order 50222. "-" indicating activation regardless of the update state is stored in the field of the update state 50223. "IGN-ON" is stored in the field of the interruption event 50231.

A fourth record in FIG. 10, that is, information stored in the confirmation script activation control information 5123 is as follows. "CONFIRMATION SCRIPT" is stored in the field of the target script 5021. "IGN-OFF" is stored in the field of the activation event 50221. "1" indicating first activation at the time of the event is stored in the field of the order 50222. "AUTOMATIC DRIVING ECU UPDATE COMPLETED" indicating that the script is activated only when the update of the automatic driving ECU is completed is stored in the field of the update state 50223. The update referred to here means a state in which write of a new program to the automatic driving ECU 15 by the automatic driving ECU update script is completed. "IGN-ON" is stored in the field of the interruption event 50231.

A fifth record in FIG. 10, that is, information stored in the new program validity script activation control information 5124 is as follows. "NEW PROGRAM VALIDITY SCRIPT" is stored in the field of the target script 5021. "IGN-OFF" indicating a timing at which an ignition signal is turned OFF is stored in the field of the activation event 50221. "3" indicating third activation at the time of the event is stored in the field of the order 50222. "-" indicating activation regardless of the update state is stored in the field of the update state 50223. "IGN-ON" is stored in the field of the interruption event 50231.

(Operation Example|Target ECU List 504)

FIG. 11 shows a specific example of the target ECU list 504 in the operation example. In the example shown in FIG. 11, since the operation example takes the automatic driving ECU 15 and the engine control ECU 13 as update targets, the automatic driving ECU 15 and the engine control ECU 13 are listed as update target ECUs.

(Operation Example|Script Correspondence Table 505)

FIG. 12 shows a specific example of the script correspondence table 505 in the operation example. In the example shown in FIG. 12, the automatic driving ECU update script 5111, the automatic driving ECU update data 5131, and the automatic driving ECU 15 correspond to each other, and the engine ECU update script 5112, the engine control ECU update data 5132, and the engine control ECU 13 correspond to each other.

(Operation Example|Sequence Diagram)

FIG. 13 is a sequence diagram showing an operation outline of an apparatus provided in the vehicle 1 when the automatic driving ECU 15 and the engine control ECU 13 are updated. That is, although the operation of each component of the gateway program 100 provided in the gateway 10 is shown in FIG. 8 described above, FIG. 13 will be described with a macro viewpoint as compared with FIG. 8. The operation shown in FIG. 13 corresponds to the total control information 502Z shown in FIG. 10.

When the ignition is turned ON (S301), the gateway 10 requests the server 2 for the update package 5 via the communication module 11 (S302). Next, the update package 5 transmitted from the server 2 is acquired based on the request and is held in the FROM 102 of the gateway 10 (S303), and the update state D1 is set to download completion.

When detecting that the download of the update package 5 is completed, the event management unit 100011 reads the script activation control information 502 in the update package via the update data management unit 10002, and activates the automatic driving ECU update script 5111 in which the activation event 50221 is "DL COMPLETED". The activation is executed by instructing the script execution unit 100013 via the control unit 100012. The script execution unit 100013 executes the automatic driving ECU update script 5111 and updates the automatic driving ECU 15 (S304). Details of S304 will be described later. The update of the automatic driving ECU 15 is completed, and the update state D102 of the automatic driving ECU 15 in the update state D1 is rewritten to "COMPLETED".

Next, when detecting that the ignition is turned OFF (S305), the event management unit 100011 reads the script activation control information 502. Then, the event management unit 100011 recognizes that three scripts in which the activation event 50221 is "IGN-OFF" exist, and focuses on the confirmation script activation control information 5123 in which the order 50222 is "1". Since the update state D1 is "AUTOMATIC DRIVING ECU UPDATE COMPLETED" in the confirmation script activation control information 5123, it is confirmed via the update state management unit 10003 that the update state D1 of the automatic driving ECU 15 is "COMPLETED". Since the update state D1 of the automatic driving ECU 15 is "COMPLETED", the event management unit 100011 instructs the script execution unit 100013 via the control unit 100012 to activate the confirmation script 5113. The script execution unit 100013 executes the confirmation script to confirm the update state D1 and user permission (S306). Details of S306 will be described later.

When the execution of the confirmation script 5113 is completed, the event management unit 100011 instructs the script execution unit 100013 via the control unit 100012 to activate the engine ECU update script 5112 in which the activation event is "IGN-OFF" and the order is "2". The script execution unit 100013 executes the script and updates the engine control ECU 13 (S307).

When the execution of the engine control ECU update script 5112 is completed, the event management unit 100011 activates the new program validity script 5114 in which the activation event is "IGN-OFF" and the order is "3". The activation is performed by instructing the script execution unit 100013 via the control unit 100012. The script execution unit 100013 executes the script to perform validity of the new program of the automatic driving ECU 15 and the engine control ECU 13 (S308).

(Operation Example|Correspondence Between Script and Operation)

Correspondence between specific examples of the script and the operation will be described with reference to FIGS. 14 to 17. FIG. 14 is a diagram showing a specific example of the automatic driving ECU update script 5111. FIG. 15 is a sequence diagram showing operation of the gateway program 100 accompanying the execution of the automatic driving ECU update script 5111. That is, FIG. 15 shows details of S304 in FIG. 13. FIG. 16 is a diagram showing a specific example of the confirmation script 5113. FIG. 17 is a sequence diagram showing operation of the gateway program 100 accompanying the execution of the confirmation script 5113. That is, FIG. 17 shows details of S306 in FIG. 13. Serial numbers described at left ends of FIGS. 14 and 16 are row numbers of the scripts, and are described for the purpose of description.

The description of the automatic driving ECU update script 5111 will be described with reference to FIG. 14. A 1st row in FIG. 14 discloses that version information is requested, and a 2nd row discloses that when the version is not "1.00", processing moves to error processing on a 23rd row and below. In a 5th row and a 12th row, the end due to exception processing is also described, but a description thereof is omitted. A 4th row discloses that a session change request for changing a session to "RUNNING WRITE MODE" is transmitted, and a 7th row discloses that a request for changing the update state D1 to "START OTA" is transmitted. A 9th row discloses that an initial value "1" is set to a variable.

10th to 15th rows disclose that a new program is sequentially transmitted to the automatic driving ECU 15 for all blocks. A 17th row discloses that a session change request for changing the session to a "NORMAL MODE" is transmitted, and a 19th row discloses that a request for changing the update state D1 to "Complete Transfer" is transmitted. A 21st row discloses returning a return value indicating a normal end to the control unit 100012 instructed to execute the automatic driving ECU update script 5111, and the 23rd row and below disclose that an end due to an error is returned to a caller of the script.

The operation of the gateway program 100 when the script execution unit 100013 executes the automatic driving ECU update script 5111 will be described with reference to FIG. 15. Although an example in which the automatic driving ECU 15 is updated is shown here, the operation is basically the same in other ECUs. The update here is data transfer and write to the automatic driving ECU 15, and does not include validity of the new program.

The control unit 100012 of the gateway 10 requests the script execution unit 100013 to activate the automatic driving ECU update script 5111 (S30401). The script execution unit 100013 performs following processing in accordance with the procedure described in the automatic driving ECU update script 5111.

The script execution unit 100013 calls diagnostic communication service of the service providing unit 100014, and transmits a version acquisition request to the automatic driving ECU 15 via the communication control unit 10007 (S30402). Based on the request, the service providing unit 100014 (S30403) and the communication control unit 10007 (S30404) operate. In step S30402, the script execution unit 100013 interprets and executes the description of the first row in FIG. 14. The automatic driving ECU 15 transmits the version information to the gateway 10 in accordance with the request (S30405). The service providing unit 100014 of the gateway 10 acquires a version via the communication control unit 10007 (S30406), and responds to the script execution unit 100013 (S30407).

Next, the script execution unit 100013 interprets the description of the 2nd row in FIG. 14, compares the received version information with version information described in the script (S30408), and ends the processing when the received version information does not match the version information described in the script (NO in S30408). Instead of writing the version information to be compared in the script, the version information may be held as metadata in the update data 5. When the version information matches as assumption (YES in S30408), the script execution unit 100013 interprets and executes the description of the 4th row in FIG. 14. That is, the script execution unit 100013 calls the diagnostic communication service of the service providing unit 100014 (S30409), and transmits a session change request to the automatic driving ECU 15 (S30411) via the communication control unit 10007 (S30410).

The session change request includes identification information of a running write mode for performing software rewrite. When the request can be accepted, the automatic driving ECU 15 changes an internal state to a mode specified by the session change request, and then transmits an acceptance response to the gateway 10 (S30412). The service providing unit 100014 of the gateway 10 acquires the response via the communication control unit 10007 (S30413), and responds to the script execution unit 100013 (S30414). If the response is an acceptance response, the script execution unit 100013 interprets the description of the 7th row in FIG. 14 and calls an update state storage service of the service providing unit 100014 in order to record that the update processing has been started (S30415). The service providing unit 100014 requests the update state management unit 10003 to store the update state (S30416), and responds a storage result to the script execution unit 100013 (S30417).

Next, the script execution unit 100013 interprets the description in the 10th to 15th rows in FIG. 14, and performs block transfer processing S30460 with loop control as follows. That is, the block transfer processing S30460 surrounded by a broken line in FIG. 15 corresponds to the processing in the loop in FIG. 14, specifically, the processing in the 11th to 14th rows. Details of the block transfer processing S30460 are as follows.

The script execution unit 100013 calls the diagnostic communication service of the service providing unit 100014 in order to transmit one block of a new program or a compressed new program or difference data included in the automatic driving ECU update data 5131 (S30421). When receiving the execution request of the diagnostic communication service for data transfer, the service providing unit 100014 first transmits a transfer start request to the automatic driving ECU 15 via the communication control unit 10007 (S30422, S30423). When the request can be accepted, the automatic driving ECU 15 transmits an acceptance response to the gateway 10 (S30424).

When acquiring the response via the communication control unit 10007 (S30425), the service providing unit 100014 transfers a part of one block of the new program or the compressed new program or the difference data to the automatic driving ECU 15 via the communication control unit 10007 (S30426, S30427). When receiving the data, the automatic driving ECU 15 transmits a reception response to the gateway 10 (S30428). The service providing unit 100014 receives a response via the communication control unit 10007 (S30429). The service providing unit 100014 repeats the data transfer processing (S30460) until the transmission of a data size requested by the immediately previous transfer start request ends. When the data transfer is completed, the service providing unit 100014, via the communication control unit 10007 (S30430), transmits a transfer completion notification to the automatic driving ECU 15 (S30431).

The automatic driving ECU transmits an acceptance response to the gateway 10 (S30432). The service providing unit 100014 receives the response via the communication control unit 10007 (S30433), and responds the transfer result to the script execution unit 100013 (S30434). If the response is successful, the script execution unit 100013 interprets the description in the 14th row in FIG. 14, and calls the update state storage service of the service providing unit 100014 in order to record that the block has been transferred (S30435). The service providing unit 100014 requests the update state management unit 10003 to store the update state (completion block) (S30436), and responds a storage result to the script execution unit 100013 (S30437). Above are details of the block transfer processing S30460. The script execution unit 100013 repeats the block transfer processing S30460 until all the blocks included in the update data are transferred.

When the transfer of all the blocks is completed, the script execution unit 100013 interprets the description in the 17th row in FIG. 14, calls the diagnostic communication service of the service providing unit 100014 (S30438), and transmits a session change request to the automatic driving ECU 15 (S30440) via the communication control unit 10007 (S30439). The session change request includes identification information of the normal mode. When the request can be accepted, the automatic driving ECU 15 changes an internal state to a mode specified by the session change request, and then transmits an acceptance response to the gateway 10 (S30441). The service providing unit 100014 of the gateway 10 acquires the response via the communication control unit 10007 (S30442), and responds to the script execution unit 100013 (S30443).

If the response is an acceptance response, the script execution unit 100013 interprets the description of the 19th row in FIG. 14 and calls the update state storage service of the service providing unit 100014 in order to record that the update has been completed (S30444). The service providing unit 100014 requests the update state management unit 10003 to store the update state (S30445), and responds a storage result to the script execution unit 100013 (S30446).

The operation of the gateway program 100 accompanying the execution of the confirmation script 5113 shown in FIG. 14 is described above.

In this way, by managing the data transfer loop in the service providing unit 100014, contents described in the script can be reduced, and the memory can be reduced and the processing failure can be reduced. Here, although the example is described in which the repetition of the block transfer is described in the script, the repetition of the block transfer may be performed by the service providing unit 100014. Although an example is described here in which the diagnostic communication service is provided as synchronization processing, asynchronous processing may be used.

The confirmation script 5113 will be described with reference to FIG. 16. A 1st row in FIG. 16 discloses that information on a speed of the vehicle 1 is acquired, and a 2nd row discloses that when a vehicle speed is not zero, the processing moves to error processing in a 9th row and below. A 4th row discloses that an agreement of the update is acquired from the user using the HMI 12. A 5th row discloses that, when the processing in the 4th row cannot be executed normally due to a failure of the HMI 12 (ERROR) or when the user rejects the update (NG), the processing moves the error processing in the 9th row and below. A 7th row discloses that a return value indicating a normal end is returned to the control unit 100012 instructing the execution of the confirmation script 5113, and a 10th row discloses that the return value indicating an abnormal end is returned to the control unit 100012.

The operation of the gateway program 100 when the script execution unit 100013 executes the confirmation script 5113 will be described with reference to FIG. 17. Asynchronously with execution of the script by the script execution unit 100013, the vehicle state management unit 10006 receives information flowing through a network in the vehicle and updates a vehicle state managed by the vehicle state management unit 10006 itself. In the example, the communication control unit 10007 receives data indicating a vehicle state transmitted from the vehicle management ECU 19 (S30602), and the vehicle state management unit 10006 acquires the data (S30603) and updates the vehicle state managed by the vehicle state management unit 10006 (S30604). Here, although the example of the state update based on the information flowing in a vehicle-mounted network has been described, as for an ignition state, the state is updated by monitoring an electric signal or the like.

The control unit 100012 requests the script execution unit 100013 to activate the confirmation script 5113 according to an instruction of the event management unit 100011 (S30601). The script execution unit 100013 first interprets the description of the 1st row of the confirmation script 5113 and calls a vehicle state acquisition service of the service providing unit 100014 (S30605). The service providing unit 100014 acquires a vehicle speed from the vehicle state management unit 10006 (S30606) and passes the vehicle speed to the script execution unit 100013 (S30607). The script execution unit 100013 interprets the description of the 2nd row of the confirmation script 5113, ends the processing (NG in S306071) when the vehicle speed is not zero, or continues the processing when the vehicle speed is zero (OK in S306071), and moves to the next processing.

Next, the script execution unit 100013 interprets the description of the 4th row of the confirmation script 5113, and calls the diagnostic communication service of the service providing unit to make an inquiry to the user via the HMI 12. The inquiry is for obtaining permission of whether or not the vehicle 1 may be not available for a while after the execution of the update is started or the new program may be validated. The service providing unit 100014 generates a command for permission acquisition to be transmitted to the HMI 12 (S30609), and transmits the command to the HMI 12 via the communication control unit 10007 (S30610, S30611). The HMI 12 displays a permission acquisition screen based on the received command, acquires a permission result by user operation (S30612), and transmits a response to the gateway 10 (S30613).

The service providing unit 100014 acquires the response via the communication control unit 10007 (S30614), analyzes a content (S30615), and passes a result of the analysis to the script execution unit 100013 (S30616). The script execution unit 100013 returns state confirmation and a user permission confirmation result to the control unit 100012 based on the received result of the analysis (S30617). The operation of the gateway program 100 accompanying the execution of the automatic driving ECU update script 5111 shown in FIG. 17 is described above.

In the diagnostic communication service, the processing up to the response from the target ECU is synchronous processing, which may also be asynchronous. An example of asynchronous processing will be described in a second embodiment. When a service is provided as the synchronization processing, the event management unit 100011 confirms the vehicle state using a period for waiting for a response, and transmits a change to the service providing unit 100014 when the vehicle state changes.

According to the first embodiment described above, the following operational effect are obtained.

(1) The gateway 10, which is an information update apparatus, updates software stored in an ECU. The gateway 10 includes the download control unit 100015 that receives the update package 5 including the ECU update data 503 which is difference data between new and old software or new software, the update script 501 including a procedure for updating software using the ECU update data 503, and the script activation control information 502 including the activation condition 5022 which is a condition of starting software update, the script execution unit 100013 that executes the software update based on the update script 501, and the event management unit 100011 that acquires a state of the vehicle 1 on which the gateway 10 and the ECU are mounted, and causes the script execution unit 100013 to execute the software update based on the update script 501 when the state of the vehicle 1 matches the activation condition 5022.

Since the gateway 10 updates the software of the ECU by executing the update script 501 included in the update package 5, it is possible to flexibly update the software along the update script 501 even if the update procedure is not determined in advance. Since an update start timing, that is, a timing of executing the update script 501 is included in the update package 5 as the activation condition 5022 of the script activation control information 502, the update can be started at an appropriate timing.

(2) The update package 5 includes a plurality of sets of the ECU update data 503, the update script 501, and the script activation control information 502. The update package 5 further includes the script correspondence table 505 indicating a correspondence relationship between the plurality of update scripts 501 and the plurality of pieces of script activation control information 502. Therefore, the gateway 10 can update the software of a plurality of ECUs simply by receiving one update package 5.

(3) The activation condition 5022 is a combination of the activation event 50221 which is an event that triggers execution and the order 50222. When activation events 50221 included in the plurality of activation conditions 5022 are the same, the event management unit 100011 determines the order of the update script 501 to be executed by the script execution unit 100013 based on the order 50222. Therefore, the software of the plurality of ECUs can be updated in a desired order using an event as a trigger.

(4) The script execution unit 100013 interrupts the update in a predetermined case.

(5) The update package 5 includes the interruption condition 5023 which is a condition for interrupting software update. When the state of the vehicle 1 matches the interruption condition 5023, the event management unit 100011 outputs an update interruption command to the script execution unit 100013. The script execution unit 100013 interrupts the update when an update interruption command is received from the event management unit 100011. Therefore, the gateway 10 can interrupt the update processing in accordance with the state of the vehicle 1.

(6) The activation event 50221 includes turning ON or OFF the ignition in the vehicle 1. Since there are ECUs whose software is difficult to update while the vehicle 1 is running, it is useful to detect that the ignition is turned OFF and execute the update script 501. In addition, since it is also assumed that the software update is divided into a plurality of steps, and a part of the steps, particularly a final step, are started with the ignition turned ON, and the vehicle 1 starts running when the update is completed, it is useful to execute the update script 501 by detecting that the ignition is turned ON. Further, since it is necessary to restart the interrupted processing, it is useful to detect that the ignition is turned ON and execute the update script 501.

(7) The activation event 50221 includes completion of reception of the update package 5. In order to update the software immediately, it is useful to detect the completion of reception of the update package 5 and execute the update script 501.

(Modification 1)

The ECU update data 503 may include information for specifying an ECU to be updated. In this case, the target ECU list 504 may not be included in the update package 5 and information indicating the ECU to be updated may not be included in the script correspondence table 505.

(Modification 2)

The gateway 10 may update software incorporated in the gateway 10. A target to be updated by the gateway 10 by receiving the update package 5 is not limited to software, and may be data or a parameter. Furthermore, the gateway 10 may update software, data, and the parameter based on one update package 5.

(Modification 3)

The script activation control information 502 may not include the interruption condition 5023. When only one piece of ECU update data 503 is included in the update package 5, the target ECU list 504 and the script correspondence table 505 may not be included in the update package 5. This is because the correspondence relationship is clear.

(Modification 4)

An update program may be stored in the update package 5 instead of the update script 501. In this case, the script execution unit 100013 may not have a function of an interpreter, and software is updated by executing the update program that is an executable file included in the update package 5.

(Modification 5)

The configuration of the gateway program 100 shown in FIGS. 3 and 4 is an example, which may be a different configuration as long as the gateway program 100 has the described functions. For example, the update control unit 10001 and the communication control unit 10007 may be integral, and the control unit 100012 may have a part of functions of the script execution unit 100013 and the service providing unit 100014.

Second Embodiment

A software update system according to a second embodiment will be described below with reference to FIGS. 18 to 26. In the following description, the same components as those of the first embodiment are denoted by the same reference numerals, and differences will be mainly described. The points not specifically described are the same as those of the first embodiment. The present embodiment is different from the first embodiment in that an update control unit includes a plurality of script execution units.
(Configuration of Update Control Unit)

FIG. 18 is a configuration diagram of the update control unit 10001A. The gateway 10 according to the second embodiment includes the update control unit 10001A instead of the update control unit 10001 in the first embodiment. The update control unit 10001A includes the event management unit 100011, the control unit 100012, a first script execution unit 1000131, a second script execution unit 1000132, the download control unit 100015, and a service providing unit 100016. The event management unit 100011, the control unit 100012, and the download control unit 100015 are the same as those in the first embodiment, and a description thereof is omitted. The first script execution unit 1000131 and the second script execution unit 1000132 correspond to the script execution unit 100013 in the first embodiment separately.

Since the update control unit 10001A includes the first script execution unit 1000131 and the second script execution unit 1000132, two scripts can be executed in parallel. However, "executed in parallel" mentioned here is that execution of another script can be started without waiting for completion of execution of a certain script by alternately using hardware resources in common, that is, the CPU 1011, in a time-division manner. The gateway 10 may include a plurality of CPUs and execute a different script in each CPU. The service providing unit 100016 includes a security filter 100017. By providing a security filter function in the service providing unit 100016, it is possible to safely maintain a diagnostic communication service executed from the script.
(Security Filter 100017)

The update package 5 transmitted by the server 2 in the present embodiment includes verification information corresponding to the ECU update data 503 and the target ECU list 504, respectively. The verification information is, for example, a digital signature or a message authentication code (hereinafter, MAC). Hereinafter, key information to be provided in advance by the server 2 and the gateway 10 when the verification information is the digital signature and when the verification information is the MAC and operation of the security filter 100017 of the gateway 10 will be described. However, in the following description, in order to avoid redundant description, only verification regarding the ECU update data 503 will be described, and a description of the target ECU list 504 is omitted.

When the verification information is the digital signature, the server 2 includes a secret key in advance, and the gateway 10 includes a public key corresponding to the secret key in advance. The server 2 signs the ECU update data 503 using the secret key and transmits the signature to the gateway 10 as the verification information together with the ECU update data 503. The security filter 100017 verifies that a signer, that is, a transmitter, is the server 2 by verifying the verification information that is the signature using the public key.

When the verification information is the MAC, the server 2 and the gateway 10 each have a common secret key in advance. The server 2 generates a MAC of the ECU update data 503 by using the common secret key, and transmits the MAC to the gateway 10 as the verification information together with the ECU update data 503. The security filter 100017 generates a MAC of the received ECU update data 503 using the common secret key, and confirms that the generated MAC matches the received verification information, thereby confirming that a generator of the MAC, that is, the transmitter, is the server 2.

FIG. 19 is a diagram showing a configuration of the script activation control information 502A. In the present embodiment, the update package 5 includes the script activation control information 502A instead of the script activation control information 502. That is, the update package 5 in the present embodiment includes the update script 501, the script activation control information 502A, the ECU update data 503, the target ECU list 504, and the script correspondence table 505.

As shown in FIG. 19, in the script activation control information 502A, an interruption condition is deleted from the script activation control information 502 in the first embodiment. The script activation control information 502A includes an allocation 50224 in the activation condition 5022. The allocation 50224 indicates a script execution unit that activates a script specified by the target script 5021. In this way, when a plurality of scripts are activated in parallel by one event, by including the allocation in the activation condition, a target script can be executed by an appropriate script execution unit.

FIG. 20 is a sequence diagram showing script activation processing according to the present embodiment. The event management unit 100011 acquires the total control information 502Z in advance, and registers an event that requires notification of occurrence in the update state management unit 10003 and the vehicle state management unit 10006 based on the total control information 502Z (S201, S202). The update state management unit 10003 and the vehicle state management unit 10006 detect a state change of the vehicle 1 (S203), and notify the event management unit 100011 of the registered event, for example, a download completion notification (S204). The event management unit 100011 determines whether or not there is a script to be activated by the first script execution unit 1000131 (S205). When there is a script to be activated by the first script execution unit 1000131, the script is executed by the first script execution unit 1000131 via the control unit 100012 (S206, S207).

Similarly, the event management unit 100011 determines whether or not there is a script to be activated by the second script execution unit 1000132 (S208). If there is a script to be activated by the second script execution unit 1000132, the script is executed by the second script execution unit 1000132 via the control unit 100012 (S209, S210). When the execution of the script is completed, the first script execution unit 1000131 and the second script execution unit 1000132 respond to the event management unit 100011 with a result (S211, S213). When receiving the response, the event management unit 100011 determines whether or not there is a script to be executed next by the first script execution unit

1000131 and the second script execution unit 1000132 (S212, S214), and causes the script to be executed as necessary.

FIG. 21 shows an example of the update package 5 when the automatic driving ECU 15 and the ADAS ECU 16 are update targets. However, in FIG. 21, a description of the verification information is omitted. The difference from FIG. 9 in the first embodiment is as follows due to a difference in the ECUs to be updated. That is, an ADAS ECU update script 5115 is provided instead of the engine ECU update script 5112, ADAS ECU update script activation control information 5125 is provided instead of the engine control ECU update script 5112, and ADAS ECU update data 5135 is provided instead of the engine control ECU update data 5132.

Contents of the confirmation script 5113A, the new program validity script 5114, the target ECU list 504, and the script correspondence table 505 are rewritten from the first embodiment in accordance with the change in the update targets.

The ADAS ECU update script 5115 is a script in which a procedure for writing a new program to the ADAS ECU 16 using the ADAS ECU update data 5135 is described. Specifically, a procedure for transferring difference data from the gateway 10 to the ADAS ECU 16 by using diagnostic communication is described. The ADAS ECU update data 5135 is data necessary for updating the ADAS ECU 16, and includes metadata describing a write destination address and the like, a program written in the ADAS ECU 16, and difference data generated from the new program.

FIG. 22 is a diagram showing an example of the total control information 502Z in a case where the automatic driving ECU 15 and the ADAS ECU 16 are the update targets. As described with reference to FIG. 19, the script activation control information 502A does not have an interruption condition but has the allocation 50224 instead. As shown in FIG. 22, the automatic driving ECU update script 5111, the confirmation script 5113A, and the new program validity script 5114 are allocated to the first script execution unit 1000131, and only the ADAS ECU update script 5115 is allocated to the second script execution unit 1000132. It can be seen from the description of the ADAS ECU update script activation control information 5125 that the ADAS ECU update script 5115 is executed by completion of download or turning ON of ignition. However, when the ignition is turned ON, a condition related to the update state 50223 is added. The update state 50223 in the activation condition 5023 of the confirmation script activation control information 5123 is that the update of the automatic driving ECU 15 is completed and the update of the ADAS ECU 16 is completed.

FIG. 23 is a sequence diagram showing a flow of software update processing when the automatic driving ECU 15 and the ADAS ECU 16 are updated. The processing until the download of the update package 5 is completed is the same as the processing in FIG. 13.

When detecting that the download is completed, the event management unit 100011 reads the script activation control information 502A in the update package 5 via the update data management unit 10002. Then, the event management unit 100011 recognizes that there are two scripts in which the activation event 50221 is "DL COMPLETED", and the order 50222 is "1" and the allocation 50224 is different between the two scripts. Therefore, the event management unit 100011 instructs the first script execution unit 1000131 to activate the automatic driving ECU update script 5111, and instructs the second script execution unit 1000132 to activate the ADAS ECU update script 5115. The two pieces of update processing are performed in parallel by the two execution units (S304 and S305).

Next, when detecting that the ignition is turned OFF (S310), the event management unit 100011 reads the script activation control information 502A in the update package 5 via the update data management unit 10002. The update state 50223 of the confirmation script activation control information 5123, in which the activation event is "IGN-OFF" and the order 50222 is "1", is "AUTOMATIC DRIVING ECU UPDATE COMPLETED" and "ADAS ECU UPDATE COMPLETED". Therefore, The event management unit 100011 confirms via the update state management unit 10003 that the update states of the automatic driving ECU 15 and the ADAS ECU 16 are "COMPLETED". Here, since both update states are "COMPLETED", activation of the confirmation script 5113A is instructed to the first script execution unit 1000131 via the control unit 100012. The first script execution unit 1000131 executes the confirmation script 5113A to confirm the vehicle state and the user permission (S311).

When the execution of the confirmation script 5113A is completed, the event management unit 100011 instructs the first script execution unit 1000131 via the control unit 100012 to activate the new program validity script 5114 in which the activation event 50221 is "IGN-OFF" and the order is "2". The first script execution unit 1000131 executes the script to validate the new program of the automatic driving ECU 15 and the ADAS ECU 16 (S312).

FIG. 24 is a diagram showing a specific example of the confirmation script 5113A in the present embodiment. In the present embodiment, the service providing unit 100014 provides a diagnostic communication service as asynchronous processing. Therefore, as described below, a behavior differs from that of the first embodiment even for the same command statement.

A 1st row in FIG. 24 discloses that information on the speed of the vehicle 1 is acquired, and a 2nd row discloses that when the vehicle speed is not zero, the processing moves to error processing in a 16th row and below. A 4th row discloses that an agreement of update is acquired from the user by using the HMI 12. However, since asynchronous processing is performed in the present embodiment, the processing of the 4th row only includes inquiring the user, for example, only displaying an inquiry dialogue on a screen, and does not include processing of obtaining a user response. A 5th row discloses that, when the inquiry to the user cannot be performed normally, for example, when the HMI 12 does not operate, the processing moves to error processing in the 16th row and below.

7th to 14th rows in FIG. 24 show permanent loop processing. An 8th row discloses that a state of the ignition is acquired, and a 9th row discloses that a return value indicating a normal end is returned to the control unit 100012 when the ignition is turned ON. An 11th row discloses that an answer inquired to the user in the 4th row is acquired. However, when the user has not selected an answer, a value indicating that no answer is given, for example, "NULL" is acquired as the answer. A 12th row discloses that, when the answer acquired in the 11th row is "OK" which is a permission of the update, a return value indicating a normal end is returned to the control unit 100012, and discloses that, when the answer required is "NG" indicating rejection of the update, the processing moves to the error processing in the 16th row and below.

That is, the description in the 7th to 14th rows in FIG. 24 indicates that, when the ignition is turned ON or an agreement of update is obtained, the processing ends normally; when the update is rejected, the processing moves to the error processing. In other words, if the user does not answer the inquiry with the ignition turned OFF, the loop processing is permanent. It is also described that the update processing is interrupted by the selection of the user.

FIG. 25 is a sequence diagram showing operation of the gateway program 100 accompanying the execution of the confirmation script 5113A. However, the same pieces of processing as those in FIG. 17 in the first embodiment are denoted by the same step numbers, and description thereof is omitted. As described above, the service providing unit 100014 provides the diagnostic communication service as asynchronous processing. The processing until the permission acquisition command is transmitted to the HMI 12, that is, the processing about three quarters from the top in FIG. 17, is the same as the processing in FIG. 17 described above. That is, S30608 corresponds to the description of the 1st row in FIG. 24.

The service providing unit 100014 generates a command for permission acquisition to be transmitted to the HMI 12 (S30609), and transmits the command to the HMI 12 via the communication control unit 10007 (S30610, S30611). The HMI 12 displays a permission acquisition screen based on the received command, and waits for a permission operation by the user operation. On the other hand, the communication control unit 10007 responds to the service providing unit 100014 whether or not the result of the transmission processing, that is, the display of the permission acquisition screen using the HMI 12 is normally performed (S30618). The service providing unit 100014 responds the transmission result to the first script execution unit 1000131 as a result of calling the diagnostic communication service (S30619). The first script execution unit 1000131 interprets the description in the 2nd row in FIG. 24, and determines only whether or not the processing is normally performed instead of whether the permission of the user is successful. If there is no abnormality, that is, if the response is not "NG", the processing moves to next processing.

Next, the first script execution unit 1000131 interprets the description of the 8th row in FIG. 24 and calls the vehicle state acquisition service in order to confirm whether or not the ignition is turned ON again (S30620). The service providing unit 100014 acquires the state of the ignition from the vehicle state management unit 10006 (S30621), and responds a result to the first script execution unit 1000131 (S30622). The first script execution unit 1000131 interprets the description in the 9th row in FIG. 24, ends the processing if the ignition is turned ON, and responds the result to the control unit 100012 (ON in S30623). While the first script execution unit 1000131 confirms the state of the ignition, the user operates the HMI 12 (S30624), and transmits the result to the gateway (S30625). The service providing unit 100014 acquires a diagnostic communication packet via the communication control unit 10007 (S30626) and analyzes the packet to hold the result (S30627).

If the ignition state is OFF (OFF in S30623), the first script execution unit 1000131 interprets the description in the 11th row in FIG. 24, calls a diagnostic communication result acquisition service (S30628), and acquires the result of the diagnostic communication service called in S30608 (S30629). It is determined whether or not the read result is a response result (S30630), if the response has not arrived, the processing after the vehicle state acquisition service call S30620 is repeated (result of S30630 has not arrived). If the response has been received (result has arrived in S30630), the first script execution unit 1000131 returns the state confirmation and the user permission confirmation result to the control unit 100012 based on the response result (S30631).

In this way, by asynchronizing the diagnostic communication service and confirming the state in the script, it is possible to interrupt the script being executed in accordance with a state change of the vehicle or the like or an instruction from the user.

FIG. 26 is a sequence diagram showing a flow of diagnostic communication service calling processing according to the second embodiment. When the diagnostic communication service is called by the first script execution unit 1000131 (S401), the service providing unit 100016 determines whether or not the request is a data write request to an ECU (S402). The data write request mentioned here corresponds to, for example, a request such as RequestDownload or WriteDataByIdentifire in the case of Unified Diagnosis Services (UDS). When the request is a write request (YES in S402), the security filter 100017 reads the target ECU list 504 in which the transmitter is confirmed to be the server 2 (S403). When the verification by the security filter 100017 fails and it is determined that the transmitter of the target ECU list 504 is not the server 2 or that the requested ECU is not included in the target ECU list 504, read of S403 fails and update is not performed.

Next, whether or not the read target ECU list 504 includes the ECU for which the write request is instructed (S404) is determined. When the read target ECU list 504 does not include the ECU (NO in S404), a response is returned without executing the diagnostic communication service (S407). When the target ECU is included in the verified target ECU list 504 (YES in S404), a diagnostic communication packet is generated (S405), and the communication control unit 10007 is requested to transmit the packet (S406). As described above, by confirming the target ECU before executing the diagnostic communication service, it is possible to prevent transmission of an illegal write request and execute a safe script.

According to the second embodiment described above, in addition to the effects described in the first embodiment, the following operational effects are obtained.

(8) The update script 501 includes processing for interrupting the update. The script execution unit 100013 interrupts the update based on the update script 501. Therefore, the gateway 10 can perform flexible software update processing including interruption of software update.

(9) The script execution unit 100013 includes the first script execution unit 1000131 and the second script execution unit 1000132. Each of the first script execution unit 1000131 and the second script execution unit 1000132 reads different update scripts 501, and updates software of different ECUs. Therefore, the gateway 10 can perform flexible software update processing including simultaneous update of a plurality of ECUs.

(10) The update package 5 includes verification information used for verification of the ECU update data 503. The gateway 10 includes the security filter 100017 that verifies the ECU update data 503 received using the verification information. Therefore, the gateway 10 can confirm the safety of the received ECU update data 503.

Modification 1 of Second Embodiment

The gateway 10 may not include the security filter 100017. In this case, the verification information may not be included in the update package 5.

Modification 2 of Second Embodiment

The gateway 10 may include three or more script execution units, and may update software of three or more ECUs at the same time.

Modification 3 of Second Embodiment

Instead of including the verification information in the update package 5, the server 2 may encrypt and transmit the update data 503 using a common secret key or a secret key. In this case, the gateway 10 decrypts the update data 503 received using the common secret key or a public key to update the software of the ECU.

The invention is not limited to the above embodiments, and includes various modifications. For example, the above embodiments have been described in detail for easy understanding of the invention, and the invention is not necessarily limited to those including all the configurations described. In addition, a part of the configuration of one embodiment can be replaced with the configuration of another embodiment, and the configuration of another embodiment can be added to the configuration of one embodiment. In addition, for a part of the configuration of each embodiment, it is also possible to add, delete, or replace another configuration or change the order of processing in each processing. For example, in the present embodiments, the software update apparatus is the gateway 10, and the communication module 11 or the HMI 12 may be a software update apparatus.

A part or all of the configurations, functions, processing units, processing methods or the like described above may be implemented by hardware by being designed using an integrated circuit or the like. The above configurations, functions, and the like may be implemented by software with a processor interpreting and executing software that achieves the respective functions. Control lines or information lines indicate what is considered necessary for an explanation, and not all control lines or information lines are shown in a product. It may be considered that almost all the configurations are actually connected to each other.

Although various embodiments and modifications are described above, the invention is not limited to these contents. Other embodiments conceivable within the scope of the technical idea of the invention are also included in the scope of the invention.

A disclosed content of the following priority basic application is incorporated herein by reference.

Japanese Patent Application No. 2017-198622 (filed on Oct. 12, 2017)

REFERENCE SIGN LIST 1 vehicle
5 update package
10 gateway
100 gateway program
501 update script
501Z total script
502 script activation control information
502Z total control information
503 update data
503Z total update data
504 target list
505 script correspondence table
100011 event management unit
100012 control unit
100013 script execution unit
100014 service providing unit
100015 download control unit
100016 service providing unit
100017 security filter

The invention claimed is:

1. An information update apparatus that updates first information stored in a vehicle control apparatus to second information, the information update apparatus comprising:
   a download control unit that receives an update package including an update body that is a difference between the first information and the second information or the second information, procedure information including a procedure for updating the first information to the second information using the update body, and an activation condition that is a condition of starting updating the first information to the second information;
wherein the first information and the second information are stored in an automatic driving electrical control unit (ECU) update script;
   an event management unit that acquires a state of a vehicle on which the vehicle control apparatus and the information update apparatus are mounted, and causes an update execution unit to execute the update based on the procedure information when the state of the vehicle matches the activation condition,
wherein the update package includes a plurality of sets of the update body, the procedure information, and the activation condition, and the update package further includes information indicating a correspondence relationship between the plurality of pieces of procedure information and the plurality of activation conditions,
the activation condition is a combination of an event that triggers execution of the update and an execution order, and
when events included in the plurality of activation conditions are the same, the event management unit determines an order of the procedure information for causing the update execution unit to execute the update based on the execution order.

2. The information update apparatus according to claim 1, further comprising:
   the update execution unit that executes the update based on the procedure information.

3. The information update apparatus according to claim 2, wherein the update execution unit interrupts the update in a predetermined case.

4. The information update apparatus according to claim 3, wherein the update package includes an interruption condition that is a condition of interrupting the update,
   the event management unit outputs an update interruption command to the update execution unit when the state of the vehicle matches the interruption condition, and
   the update execution unit interrupts the update when the update interruption command is received from the event management unit.

5. The information update apparatus according to claim 3, wherein the procedure information includes processing of interrupting the update, and
   the update execution unit interrupts the update based on the procedure information.

6. The information update apparatus according to claim 2, wherein the update package includes a target list that is a list of vehicle control apparatuses to be updated, and verification information used for verification of the target list, and the information update apparatus further includes a security filter that verifies the target list using the verification information and stops the update by the update execution unit when the vehicle control apparatus updated based on the procedure information is not included in the verified target list.

7. The information update apparatus according to claim 2, wherein the activation condition includes turning ON an ignition or turning OFF the ignition in the vehicle.

8. The information update apparatus according to claim 1, wherein the update execution unit may update a plurality of pieces of the first information in parallel based on the plurality of pieces of the procedure information.

9. The information update apparatus according to claim 2, wherein the activation condition includes completion of reception of the update package.

10. An information update method in which a computer updates first information stored in a vehicle control apparatus to second information, the information update method comprising:

receiving an update package including an update body that is a difference between the first information and the second information or the second information, procedure information including a procedure for updating the first information to the second information using the update body, and an activation condition that is a condition of starting updating the first information to the second information; and acquiring a state of a vehicle on which the vehicle control apparatus and the computer are mounted, and causing an update execution unit to execute the update based on the procedure information when the state of the vehicle matches the activation condition;

wherein the update package includes a plurality of sets of the update body, the procedure information, and the activation condition, and the update package further includes information indicating a correspondence relationship between the plurality of pieces of procedure information and the plurality of activation conditions, the activation condition is a combination of an event that triggers execution of the update and an execution order, the first information and the second information are stored in an automatic driving electrical control unit (ECU) update script, and when events included in the plurality of activation conditions are the same, the event management unit determines an order of the procedure information for causing the update execution unit to execute the update based on the execution order.

* * * * *